(12) United States Patent
Yamada et al.

(10) Patent No.: US 9,193,320 B2
(45) Date of Patent: Nov. 24, 2015

(54) IMPACT ABSORBING MEMBER AND BUMPER DEVICE

(75) Inventors: Yutaka Yamada, Aichi (JP); Sunao Tanaka, Aichi (JP); Koshi Okada, Aichi (JP); Takuya Fukunaga, Shiga (JP); Masaki Kumagai, Aichi (JP)

(73) Assignee: UACJ CORPORATION, Tokyo (JP)

( * ) Notice: Subject to any disclaimer, the term of this patent is extended or adjusted under 35 U.S.C. 154(b) by 110 days.

(21) Appl. No.: 14/124,698

(22) PCT Filed: May 10, 2012

(86) PCT No.: PCT/JP2012/061973
§ 371 (c)(1),
(2), (4) Date: Dec. 6, 2013

(87) PCT Pub. No.: WO2012/169310
PCT Pub. Date: Dec. 13, 2012

(65) Prior Publication Data
US 2014/0125073 A1    May 8, 2014

(30) Foreign Application Priority Data

Jun. 10, 2011  (JP) ................................. 2011-130377
Sep. 7, 2011  (JP) ................................. 2011-194605

(51) Int. Cl.
*B60R 19/34* (2006.01)
*B21D 53/88* (2006.01)

(52) U.S. Cl.
CPC ............... *B60R 19/34* (2013.01); *B21D 53/88* (2013.01)

(58) Field of Classification Search
CPC .......... B60R 19/34; B60R 19/26; B21D 53/88
USPC .............. 293/132, 133, 154, 155; 296/187.09, 296/203.02
See application file for complete search history.

(56) References Cited

U.S. PATENT DOCUMENTS

| 6,334,638 | B1 | 1/2002 | Yamamuro et al. |
|---|---|---|---|
| 2009/0001737 | A1* | 1/2009 | Salomonsson ................ 293/133 |
| 2011/0181063 | A1 | 7/2011 | Hellstrom |

FOREIGN PATENT DOCUMENTS

| EP | 1762438 A1 | 3/2007 |
|---|---|---|
| JP | H05116645 A | 5/1993 |

(Continued)

OTHER PUBLICATIONS

Extended European Search Report dated Oct. 20, 2014 in counterpart European patent application No. 12797385.7, including Search Report, Supplementary European Search Report and examined claims 1-11.

(Continued)

*Primary Examiner* — Stephen Gordon
(74) *Attorney, Agent, or Firm* — J-Tek Law PLLC; Jeffrey D. Tekanic; Scott T. Wakeman

(57) ABSTRACT

An impact absorbing member is formed by bending one sheet of a metal plate material and then joining adjacent end parts thereof. The impact absorbing member includes the following integrally-connected portions: a fixing plate, an impact absorbing part having two first side wall plates and two second side wall plates, two flange plates, and two bridge plates. The impact absorbing part overall has an approximate square or rectangular tube shape after being bent. Joining parts are provided at each opposing end parts of the first and second side wall plates. The adjacent end parts of the first and second side wall plates overlap and are joined. The end parts of the two flange plates are also joined to the end parts of the two bridge plates.

20 Claims, 30 Drawing Sheets

(56) References Cited

FOREIGN PATENT DOCUMENTS

| | | | |
|---|---|---|---|
| JP | 2000344029 A | 12/2000 |
| JP | 2001058550 A | 3/2001 |
| JP | 2002012105 A | 1/2002 |
| JP | 2006206000 A | 8/2006 |
| JP | 2007030647 A | 2/2007 |
| JP | 2007261557 A | 10/2007 |
| JP | 2008120324 A | 5/2008 |
| JP | 2009061845 A | 3/2009 |
| WO | 2010002309 A1 | 1/2010 |

OTHER PUBLICATIONS

English translation of International Preliminary Report on Patentability for parent application No. PCT/JP2012/061973.

English translation of International Search Report for parent application No. PCT/JP2012/061973.

* cited by examiner

IMPACT ABSORBING MEMBER AND BUMPER DEVICE

CROSS-REFERENCE

This application is the US national stage of International Patent Application No. PCT/JP2012/061973 filed on May 10, 2012, which claims priority to Japanese Patent Application No. 2011-130377, filed on Jun. 10, 2011, and to Japanese Patent Application No. 2011-194605, filed on Sep. 7, 2011.

FIELD

The present invention relates to an impact absorbing member and a bumper device.

BACKGROUND ART

Conventionally, bumpers are provided at the front or at the rear of a vehicle such as a car for mitigating impact energy transmitted to the vehicle by absorbing the impact at the time of a collision with another vehicle. The bumper typically includes an outer cover made of a resin, a reinforcement that extends in the vehicle width direction, and a foamed resin that fills a gap between the outer cover and the reinforcement. The reinforcement is mounted on a frame of a vehicle body via an impact absorbing member that absorbs impact energy by undergoing buckling deformation.

For example, as described in Patent Document 1 or the like, hollow-extruded-shaped materials made of aluminum alloy and having a predetermined cross-sectional shape, which takes into consideration the impact absorption, have been widely used as the above-mentioned impact absorbing member.

In addition, in Patent Document 2 an impact absorbing member is proposed that is obtained by press deep drawing an aluminum plate material to form a bottomed cylindrical body and then forming a spiral-shaped step on the outer wall surfaces by press working the bottomed cylindrical body in the axial direction.

PRIOR ART DOCUMENTS

Patent Documents

Patent Document 1: JP-A-2007-030647
Patent Document 2: JP-A-2007-261557

SUMMARY OF THE INVENTION

However, the conventional art is problematic in the following points. That is, in case the impact absorbing member is constituted by using an extruded-shaped material, in addition to the extruded-shape material serving as the impact absorbing part, a fixing plate for fixing it to reinforcement and a flange plate for fixing it to a frame of a vehicle body are required. Therefore, the part count is increased to three. In addition, to integrally combine the respective members, the entire circumference of one end part of the extruded shaped material must be welded to the fixing plate and the entire circumference of the other end part of the extruded shaped material must be welded to the flange plate. Therefore, there are problems in that the manufacturing steps increase and it is inferior for mass production.

On the other hand, the impact absorbing member described in Patent Document 2 has a restriction of the material surface, because materials with high deep drawability must be used. In addition, there are problems in that, also in the processing other than the deep drawing, it is necessary to perform press working with a high degree of precision for forming the spiral-shaped step on the outer wall surfaces of the bottomed cylindrical body and it is inferior in mass production.

The present invention has been made in view of these circumstances, and it is intended to provide an impact absorbing member, which can reduce the part count and has favorable mass productivity as compared to the prior art, as well as a bumper device that uses this impact absorbing member.

One aspect of the present invention is an impact absorbing member that is configured in its entirety by bending one sheet of a metal plate material, including:

a fixing plate of an approximate square shape for fixing to a reinforcement for reinforcing a bumper of a vehicle;

an impact absorbing part comprising two first side wall plates of an approximate square shape, which extend towards one side substantially perpendicularly from two opposite sides of the fixing plate, and two second side wall plates of an approximate square shape, which extend towards the side in the same direction as said one side substantially perpendicularly from the remaining two opposite sides of the fixing plate;

two flange plates for fixing to a frame of a vehicle body, and which extend substantially perpendicularly outwardly at the two first side wall plates to the outside from the side thereof opposite of the fixing plate side; and two bridge plates that bridge gaps between the end parts of the two flange plates, and which extend substantially perpendicularly outwardly at the two second side wall plates from the side thereof opposite of the fixing plate side, wherein the impact absorbing part is configured in an approximate square tube shape, and comprises joining parts that overlap and join opposite edge parts of the two first side wall plates with opposing edge parts of the two second side wall plates that are respectively adjacent to the opposite edge parts of the two first side wall plates, and the end parts of the two flange plates are joined to end parts of the two bridge plates.

Another aspect of the present invention relates to a bumper device, including:

a reinforcement for reinforcing a bumper of a vehicle and the above-described impact absorbing member, wherein the fixing plate of the impact absorbing member is fixed to the reinforcement.

The impact absorbing member is configured in its entirety by bending one sheet of a metal plate material. That is, a blank having the fixing plate, the impact absorbing part provided with the two first side wall plates and the two second side wall plates, the two flange plates and the two bridge plates are made from one sheet of the metal plate material; the entirety of the impact absorbing member is shaped by bending the blank which integrally connects these respective parts. Therefore, the impact absorbing member, as compared to the impact absorbing member that uses a conventional extruded-shape material, can reduce the part count.

In addition, the fixing plate is connected to the first side wall plate and the fixing plate is connected to the second side wall plate respectively in an integrated manner by bending one sheet of a metallic plate material. Similarly, the first side wall plate is connected to the flange plate and the second side wall plate is connected to the bridge plate respectively in an integrated manner by bending one sheet of a metallic plate material. Therefore, unlike the conventional impact absorbing member that uses the extruded-shape material, it is not needed to cut respective members and to linearly weld the entire circumferences of the opposite ends of the impact absorbing part to the fixing plate and the flange plate. As a result, the impact absorbing member can simplify the manufacturing steps and has favorable mass productivity.

Here, in the case of utilizing a configuration such that the cut ends of the adjacent first and second side wall plates are linearly joined to each other by linear welding or the like in order to form the impact absorbing part in an approximate square tube shape as a whole, it is difficult to join the corners linearly, which results in low mass productivity. In addition, the joining parts of the cut ends prevent buckling deformation of the impact absorbing part, which decreases the impact absorption properties.

On the other hand, the impact absorbing part includes the joining parts in which the opposite edge parts of the two first side wall plates and the opposite edge parts of the two second side wall plates respectively adjacent to the opposite edge parts of these two first side wall plates overlap and are joined. The impact absorbing part is formed in the approximate square tube shape. Therefore, it is not needed to directly join the cut ends of the adjacent first and second side wall plates with each other by abutting them with each other, and it assists in ensuring favorable mass productivity by easily joining the plates by overlapping and joining. Further, rigidity is ensured by joining the end parts of two flange plates to the end parts of two bridge plates. Therefore, the impact absorbing part can appropriately buckle and deform without causing lateral buckling or the like, and the necessary impact absorption properties can be ensured.

As described above, it is possible to reduce the part count and provide a favorable impact absorbing member having high mass productivity as compared to the conventional types.

The bumper device uses the above-described impact absorbing member. Therefore, according to the above-described bumper device, it is possible to reduce the part count as compared to the prior art, and provide a favorable bumper device with respect to mass productivity too.

MODES FOR CARRYING OUT THE INVENTION

Figure 1:
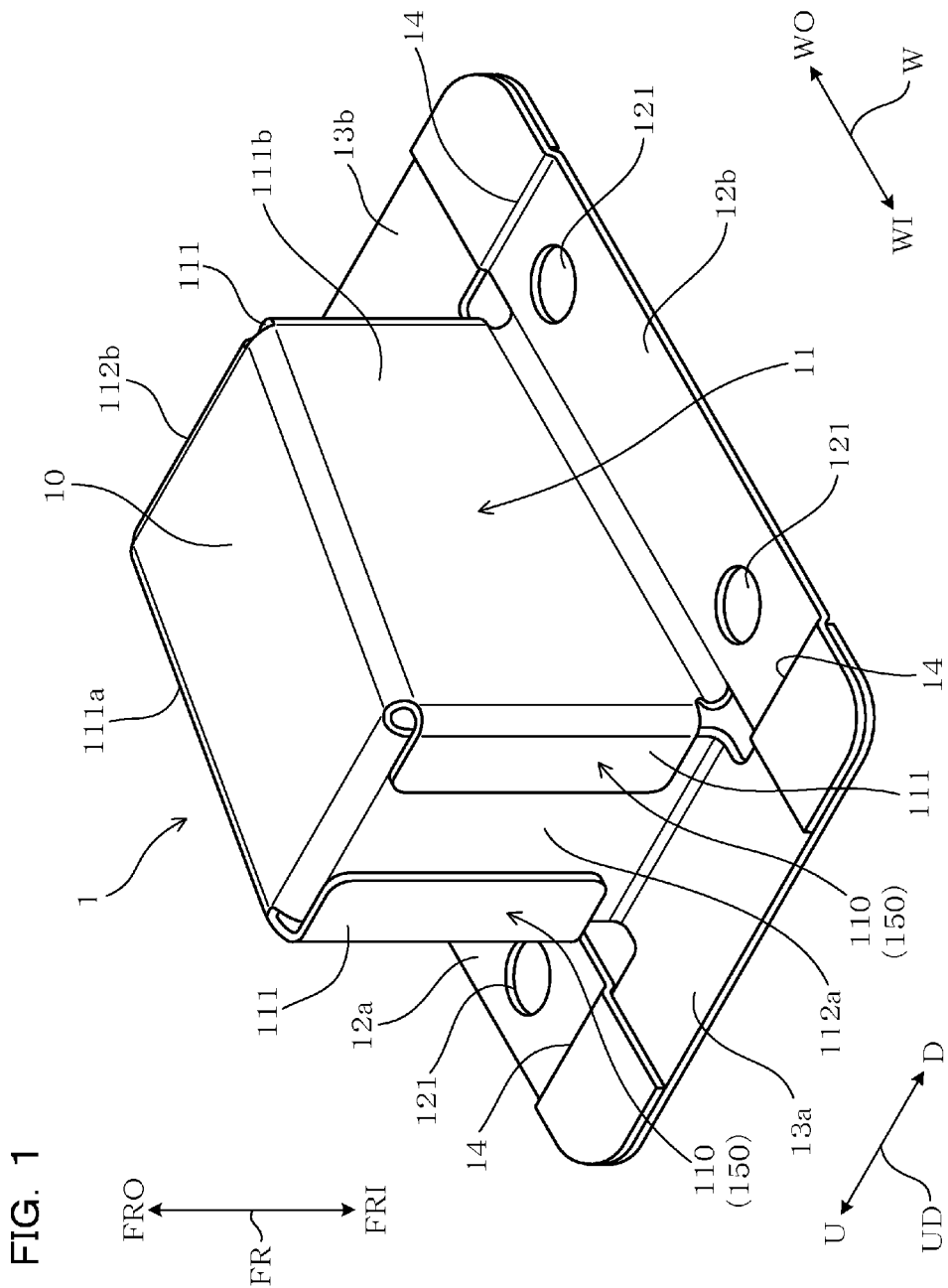
FIG. 1 is a perspective view illustrating the configuration of the impact absorbing member according to Example 1.

First, the impact absorbing member will be described. As was described above, the entirety of the impact absorbing member is configured by bending one sheet of a metallic plate material. That is, each of the fixing plate and the first side wall plate, the fixing plate and the second side wall plate, the first side wall plate and the flange plates, and the second side wall plate and the bridge plates of the impact absorbing member is made from one sheet of the metallic plate material in the state of remaining connected to each other, and then the respective plates are bent and integrated at joined parts.

The fixing plate of the impact absorbing member is for fixing to the reinforcement for reinforcing the vehicle bumper. Specifically, the fixing plate is fixed to the reinforcement with its outer surface abutting on the side wall surface of the reinforcement inside the vehicle. As methods of fixing the fixing plate, for example, fastening by fastening members such as bolts and nuts, mechanical joining by caulking, self-piercing rivets or the like, spot welding, friction stir welding, and the like can be given as examples, and one method thereof can be used or 2 or more methods thereof can be used in combination. The fixing plate of the impact absorbing member is formed in an approximate square shape. The shape of the fixing plate is preferably an approximate rectangle shape from the stand point of ensuring the mounting area to the reinforcement, the simplicity of mounting, and the like.

The impact absorbing part of the impact absorbing member is comprised of a total of four side wall plates, namely, two first side wall plates and two second side wall plates. Both of two first side wall plates are formed in an approximate square shape, and each of them extends substantially perpendicularly towards one side from two opposite sides of the fixing plate. For example, in case the fixing plate has an approximate rectangle shape, each of two first side wall plates can extend substantially perpendicularly towards one side from the opposite two long sides of the fixing plate. On the other hand, each of two second side wall plates extends substantially perpendicularly from the remaining two opposite sides of the fixing plate in the same direction as said one side. For example, in case the fixing plate has an approximate rectangle shape, each of two second side wall plates can extend substantially perpendicularly from the opposite two short sides of the fixing plate in the same direction as said one side. Thus, the respective side wall plates of the impact absorbing part are bent towards said one side such that they are arranged substantially perpendicularly to the fixing plate, the respective first side wall plates are arranged so as to oppose each other, and the respective second side wall plates are arranged so as to oppose each other.

The joining parts of the impact absorbing member may be configured as side wall plate joining parts in which joining margins, which are respectively provided on the opposite edge parts of the two first side wall plates and extend along the plate surfaces of the second side wall plates adjacent to the first side wall plates, overlap and are joined with the opposite edge parts of the adjacent second side wall plates. Or, the joining parts of the impact absorbing member may be configured as side wall plate joining parts in which joining margins, which are respectively provided on the opposite edge parts of the two second side wall plates and extend along the plate surfaces of the first side wall plates adjacent to the second side wall plates, overlap and are joined with the opposite edge parts of the adjacent first side wall plates.

In this case, at the time of buckling deformation of the side wall plate joining parts, the joining margins of the first side wall plate (the second side wall plate) and the second side wall plate (the first side wall plate), which are overlapped by and joined to the joining margin, are more likely to have the same deformation modes. That is, both are more likely to be integrally deformed. Therefore, there is an advantage that a load in a direction that causes the two to separate rarely occurs, and it is easy to suppress breakage of the side wall plate joining parts.

The specific configurations of the side wall plate joining part are as follows.

That is, the joining margins that extend along the plate surfaces of the adjacent second side wall plates are provided on the opposite edge parts of the two first side wall plates, i.e. the respective remaining two sides that do not contact the fixing plate and the flange plate. Moreover, the side wall plate joining parts are formed by overlapping and joining the joining margins of the first side wall plates and the opposite edge parts of the second side wall plates. In this case, the side wall plate joining parts preferably can be configured by overlapping and joining the inner surface of the joining margin of the first side wall plate and the outer surface on the edge part of the second side wall plate. In addition, it is also possible to form the side wall plate joining parts by overlapping and joining the outer surface of the joining margin of the first side wall plate and the inner surface on the edge part of the second side wall plate. In addition, instead of the above, the joining margins extending along the plate surfaces of the adjacent first side wall plates are provided on the opposite edge parts of the two second side wall plates, i.e. the respective remaining two sides that do not contact the fixing plate and the bridge plate. In addition, the side wall plate joining parts are formed by overlapping and joining the joining margins of the second side wall plates and the opposite edge parts of the first side wall plates. In this case, the side wall plate joining parts preferably can be configured by overlapping and joining the inner surface of the joining margin of the second side wall plate and the outer surface on the edge part of the first side wall plate. In addition, it is also possible to form the side wall plate joining parts by overlapping and joining the outer surface of the joining margin of the second side wall plate and the inner surface on the edge part of the first side wall plate. The impact absorbing part can be configured as a whole in an approximate square tube shape by being provided with the side wall plate joining parts having the configuration as described above. Further, the joining margins can be formed by bending the opposite edge parts of the first side wall plates or the second side wall plates. In addition, to prevent horns from being created at the peripheral borders of the gaps, R is preferably provided at the peripheral borders of gaps that can form at the connection parts for the impact absorbing part at the four corners of the fixing plate of the impact absorbing member. Stress concentration is less likely to occur at the time of buckling deformation, and it is possible to readily prevent cracks from being generated from these portions. For example, R can be set within the range between 1.5 to 7.5 mm.

Besides being configured as the above-described side wall plate bound parts, the joining parts of the impact absorbing member may be configured as flange-shaped joining parts, in which the joining margins are respectively provided on the opposite edge parts of the two first side wall plates and the opposite edge parts of the two second side wall plates, and the adjacent joining margins of the first side wall plates and the joining margins of the second side wall plates overlap and are joined.

A specific configuration of the flange-shaped joining parts is as follows. That is, the joining margins are provided on the opposite edge parts of the two first side wall plates, i.e. the respective remaining two sides that do not contact the fixing plate and the flange plate. In addition, the joining margins are provided on the opposite edge parts of the two second side wall plates, i.e. the respective remaining two sides that do not contact the fixing plate and the bridge plate. After that, the flange-shaped joining parts are formed by overlapping and joining the joining margins of the adjacent first side wall plate and second side wall plate. In this case, the flange-shaped joining parts preferably can be configured by overlapping and joining the inner surface of the joining margin of the first side wall plate and the inner surface of the joining margin of the second side wall plate. The impact absorbing part can be configured in its entirety in an approximate square tube shape with the exception of the flange-shaped joining parts. Further, the flange-shaped joining parts can project outwardly from the respective corners of the impact absorbing part. The flange-shaped joining parts can be specifically configured, for example, by overlapping and joining the inner surface of the joining margin of the second side wall plate, which is substantially perpendicularly bent, and the inner surface of the joining margin of the first side wall plate that is not bent. In case the flange-shaped joining parts are configured in this manner, the flange-shaped joining parts are formed substantially parallel to the first side wall plates. Therefore, upon mounting the flange plate on the frame of the vehicle body, favorable mounting workability can be easily ensured since the flange-shaped joining part does not obstruct the mounting of the flange plate. In addition, the flange-shaped joining parts also can be configured by overlapping and joining the inner surface of the joining margin of the first side wall plate, which is substantially perpendicularly bent, and the inner surface of the joining margin of the second side wall plate that is not bent. Further, the flange-shaped joining parts can be also configured by overlapping and joining the inner surface of the joining margin of the first side wall plate, which is bent at a predetermined angle relative to the flat surface of the first side wall plate, and the inner surface of the joining margin of the second side wall plate that is bent at a predetermined angle relative to the flat surface of the second side wall plate.

One or two or more notched parts may be formed on the flange-shaped joining part.

In this case, the notched parts become origins of deformation of the buckling deformation. Therefore, it is possible to easily avoid that a maximum load, which is applied to the bumper device that uses the impact absorbing member, will become too large, making it possible to assist in reducing damage to the vehicle. Further, the impact absorbing part easily undergoes buckling-deformation in a stable manner (it excels in robustness). The notched part(s) may be formed on at least one flange-shaped joining part of the impact absorbing part. The notched part(s) is (are) preferably formed on the flange-shaped joining part(s), which is (are) disposed on the vehicle interior side in the vehicle width direction. It is possible to easily obtain the above-described effects. In addition, the shape of the notched part(s) is not particularly limited. For example, shapes such as an approximate triangle and an approximate semicircle can be exemplified as the shape of the notched part. Such shape(s) can be used in combinations of 1 or 2 or more. In addition, from the view point that the notched part(s) will readily function as an origin of deformation of the buckling deformation, the notched part(s) is (are) preferably formed anywhere in the flange-shaped joining part within a range of up to three-quarters from the fixing plate side. The notched part(s) is (are) more preferably formed anywhere in the flange-shaped joining part within a range of up to one-half from the fixing plate side.

The two flange plates of the impact absorbing member extend substantially perpendicularly outwardly from the sides, which are opposite of the fixing plate side, of two first side wall plates. Specifically, the respective flange plates are outwardly bent such that they are disposed substantially perpendicularly to the respective first side wall plates. These two flange plates are used, for example, for fixing the impact absorbing member to a frame of a vehicle body by using a fixing method, such as by fastening using fastening components such as bolts and nuts, mechanical joining using caulking, self-piercing rivets or the like, spot welding, friction stir welding, or the like. For example, an approximate square shape or the like having a longer side than the intersecting part of the flange plate and the first side wall plate can be exemplified as a basic shape of the flange plate.

The two bridge plates of the impact absorbing member extend substantially perpendicularly outwardly from the sides, which are opposite to the fixing plate side, of two second side wall plates. Specifically, the respective bridge plates are bent outwardly such that they are disposed substantially perpendicularly to the respective second side wall plates. These two bridge plates are for respectively bridging the gaps between the opposing end parts of the two flange plates. For example, an approximate square shape or the like having a longer side than the intersecting part of the bridge plate and the second side wall plate can be exemplified as a basic shape of the bridge plate.

For the impact absorbing member, the end parts of two flange plates and the end parts of two bridge plates are respectively overlapped and joined to each other. That is, the opposite end parts of one bridge plate overlap and are joined to the end parts on one side of the two flange plates adjacent to this bridge plate. The opposite end parts of the other bridge plate overlap and are joined to the end parts on the other side of two flange plates adjacent to this bridge plate. Further, the opposite end parts of the bridge plate may be joined to the surface on the impact absorbing part side of the flange plate or may be joined to the surface on the vehicle body frame side (the opposite side of the impact absorbing part side) of the flange plate. In the latter case, step parts are preferably provided by bending the end parts of the flange plate taking into consideration the plate thickness of the bridge plate such that the surface on the vehicle body frame side of the flange plate and the surface on the vehicle body frame side of the bridge plate are located on the same surface. In this case, the contact properties of the flange plate to the vehicle body frame are improved, making it possible to reliably fix the flange plates to the vehicle body frame.

Joining at the joining parts of the impact absorbing member is preferably carried out by welding. Specifically, joining of the side wall plate joining parts is preferably done by welding. Similarly, joining of the flange-shaped joining parts is preferably done by welding.

The joining parts are joined in the state of the plates overlapping each other. Specifically, in the case of the side wall plate joining parts, the joining margins of the first side wall plate and the second side wall plate or the joining margins of the second side wall plate and the first side wall plate overlap and are joined. In addition, in the case of the flange-shaped joining parts, the respective joining margins of the adjacent first and second side wall plates overlap and are joined. Therefore, they can be joined according to various joining methods, making it possible to easily ensure favorable mass productivity due to the high degree of freedom in joining. In addition, at the time of joining, any joining system, such as either point joining or linear joining, can be utilized. Therefore, by appropriately utilizing either point joining and/or linear joining, it is easy to design the impact absorbing member taking into consideration the maximum load (depending on the type of car) that will be applied to the bumper device using the impact absorbing member, the impact absorbing properties or the like.

In case the joining is point joining, even if the maximum load is set to be relatively low, for example, a minicar, it becomes difficult to inhibit the buckling deformation of the impact absorbing part. Therefore, it becomes easy to ensure the appropriate buckling deformation of the impact absorbing part. In addition, it is easy to achieve cost reductions. As specific methods of point joinings, for example, friction stir spot welding, spot welding, self-piercing rivets or the like can be exemplified, and these methods can be used in combinations of one or two or more. In addition, the point joining can be constituted from one or two or more point joined parts.

In addition, in case the joining is linear joining, even if the maximum load is set to be relatively high, for example, a mid-size car or a large-size car, it is possible to ensure the joining strength of the joining parts. Therefore, the joining part is not destroyed at the time of the initial application of the load, thereby ensuring an appropriate buckling deformation. As specific linear joining methods, for example, friction stir linear welding, linear welding or the like can be exemplified, and these methods can be used in combinations of one or two or more. In addition, the linear joining may be constituted by (a) continuous linear joined part(s) or may be constituted by discontinuous linear joined parts. In addition, the linear joining can be constituted by one or 2 or more linear joined parts.

According to the impact absorbing member, the joining between the flange plate and the bridge plate is preferably made by welding. Further, as specific joining system, a specific joining method or the like, joining methods similar to the above-described joining methods of the joining part can be utilized.

One or two or more bead parts can be formed at at least one intersecting part of the first side wall plate and the flange plate of the impact absorbing member and/or at at least one intersecting part of the second side wall plate and the bridge plate of the impact absorbing member. Further, the intersecting part can be formed by bending.

Vehicles, such as a car, are sometimes towed. Towing of the vehicle is carried out by pulling a towing hook provided on the reinforcement within the bumper in the forward direction of the vehicle (in the case of a front bumper) or in the rearward direction of the vehicle (in the case of a rear bumper). Accordingly, for an impact absorbing member that connects the reinforcement to the vehicle body frame, it is desirable that it is less deformable with respect to tensile loading (towing loads) that will be applied during the towing.

In such a case, when the above-described configuration is utilized, it is possible to improve the rigidity of the intersecting parts to which the relatively large load is applied in accordance with the towing load, improving the resistance to deformation with respect to the towing load. Therefore, favorable towing properties can be achieved because the impact absorbing member resists permanently deforming even when the towing load is applied in the forward direction of the vehicle (in case the impact absorbing member is utilized the front bumper side) or in the rearward direction of the vehicle (in case the impact absorbing member is utilized at the rear bumper side) with the fixing plate fixed to the reinforcement and the flange plate fixed to the vehicle body frame. In addition, mass productivity is not easily diminished since it is relatively easy to introduce the bead part(s) into the intersecting parts.

There are two intersecting parts of the first side wall plates and the flange plates of the impact absorbing member; however, the bead parts may be formed at either one of the intersecting parts or at both intersecting parts. Similarly, there are two intersecting parts of the second side wall plates and the bridge plates of the impact absorbing member; however, the bead parts may be formed at either one of the intersecting parts or at both intersecting parts. In addition, the bead parts may be formed at the two intersecting parts of the first side wall plates and the flange plates and at the two intersecting parts of the second side wall plates and the bridge plates, namely, at the intersecting parts of the edges on the side opposite of the fixing plate of the impact absorbing part that is formed in an approximate square tube shape and the flange plates and the bridge plates. The bead part(s) can be appropriately formed in accordance with the required towing load. Further, the bead part(s) may be provided at least at the intersecting part and may partly exist in a state of taking the first side wall plate (the second side wall plate) and the flange plate (the bridge plate).

If the bead part can improve the rigidity of the intersecting part formed by bending, the shape of the bead part is not particularly limited. The bead part can be preferably formed by plastic-deformation of a part or all of the intersecting part which is formed by bending from its mountain fold side towards its valley fold side or from its valley fold side towards its mountain fold side. More specifically, for example, the bead part can be configured by a bulging part or the like that is caused to bulge out by plastic-deformation of a part of the intersecting part which is formed by bending from its mountain fold side towards its valley fold side. For example, the bead part may have a shape such as an approximate triangle and an approximate semicircle, when a cut surface is sliced by a plane which has an angle of 45° with the flange plate (the bridge plate), the plane including the intersecting part of the first side wall plate (the second side wall plate) and the flange plate (the bridge plate). A bead part having a cross-section that is an approximate triangle can be formed relatively easily by die forming or the like. Therefore, it becomes possible to easily contribute to improvement of mass productivity.

The pitch between the bead parts can be appropriately set depending on the length of the intersecting part of the first side wall plate (the second side wall plate) and the flange plate (the bridge plate). The pitch between the bead parts can be selected, for example, in the range of 15 to 50 mm.

In addition, in case the opposite end part sides of the flange plate are fixed to the vehicle body frame using bolts and nuts or the like, it is preferable that the bead part(s) is (are) at least provided at the intersecting part of the first side wall plate and the flange plate at the inside of the fixed positions on the opposite end part sides of the flange plate. The inner side of the fixed positions at the opposite end part sides of the flange plate in the intersecting part of the first side wall plate and the flange plate tends to be deformed by a towing load. Therefore, according to the above-described configuration, it is possible to effectively improve the resistance to deformation of the intersecting part.

The flange plate and/or the bridge plate of the impact absorbing member preferably have a bent piece formed by being bent toward the impact absorbing part side.

In this case, it is possible to improve the rigidity of the flange plate and/or the bridge plate, to which a relatively-large load is applied by a towing load and this improves the resistance to deformation with respect the towing load. Therefore, favorable towing properties can be achieved because the impact absorbing member resists permanently deforming even when the towing load is applied in the forward direction of the vehicle (in case the impact absorbing member is utilized on the front bumper side) or in the rearward direction of the vehicle (in case the impact absorbing member is utilized on the rear bumper side) with the fixing plate fixed to the reinforcement and the flange plate fixed to the vehicle body frame.

The bent piece(s) may be formed on either of two flange plates or may be formed on both of them. The latter case excels in a balance of resistance to deformation. Similarly, the bent piece(s) may be formed on either of two bridge plates or may be formed on both of them. The latter case excels in a balance of resistance to deformation. In addition, in case the bent pieces are formed on the two flange plates and on the two bridge plates, the balance of resistance to deformation further excels.

In addition, a configuration can be also utilized, in which a projecting piece that projects outwardly from the side of the flange plate on the side opposite of the first side wall plate side extends and the bent piece is formed by bending this projecting piece toward the impact absorbing part side. In this case, it is preferable that the longitudinal length of the bent piece is shorter than the distance between the joined points with the bridge plate formed on the opposite end parts of the flange plate. It is because, when forming the bent piece on the flange plate by bending the projecting piece, the bent piece no longer interferes with the bent bridge plate. Therefore, it is possible to ensure favorable towing properties without losing mass productivity.

The bent angle of the bent piece is preferably in the range of 70-135°, more preferably, 80-125°. It is because inconveniences tend to occur such as the effect of bending becomes small when the bent angle becomes larger than 135°, and the bent piece tends to interfere with the impact absorbing part, bending becomes difficult and the like when the bent angle becomes smaller than 70°. Further, the bent angle is the angle between the flange plate on the impact absorbing part side and the bent piece extending therefrom and the angle between the bridge plate on the impact absorbing part side and the bent piece extending therefrom in case the bent piece extends from the flange plate or the bridge plate. In addition, the bent angle is the angle between the plate surface on which the flange plate on the impact absorbing part side is not bent and the bent piece continued to this surface in case the bent piece is formed by bending the flange plate itself and the bridge plate itself.

Further, for the impact absorbing member, in order to improve the towing properties, a configuration such that bead parts are formed on the intersecting part(s) may be utilized or a configuration such that the flange plate and/or bridge plate include(s) the bent piece may be utilized. Further, a configuration such that both of the bead parts and the bent piece are provided can be also utilized. It is possible to select the configuration taking into consideration the space for the impact absorbing member to be installed, the mounting characteristics to the vehicle body frame, the necessary towing properties or the like.

The metal plate material of the impact absorbing member is preferably an aluminum plate material.

In this case, it is possible to facilitate weight savings of the impact absorbing member. In addition, it is also possible to reduce the weight of the bumper device using the impact absorbing member. Further, "aluminum" is a generic name for the metal and alloys mainly composed of aluminum and is a term that includes pure aluminum as well as aluminum alloys.

It is preferable that the aluminum plate material is made of a 5000 series aluminum alloy, a 6000 series aluminum alloy or the like. For example, 5052, 5083, 5154, and 5182 or the like are exemplified as the 5000 series aluminum alloy and for example, 6009, 6016, 6111, 6061, and 6063 or the like are exemplified as the 6000 series aluminum alloy. In addition, the thickness of the aluminum plate material is preferably in the range of 1 to 5 mm, more preferably, in the range of 2 to 4 mm from the view point of ensuring favorable impact absorbing properties or the like.

Next, the bumper device will be described. The reinforcement of the bumper device is preferably a hollow shape from the view point of improving the impact absorbing properties of the bumper device. In addition, in this case, one or two or more ribs that connect the inner surfaces of the side wall surfaces to each other may be provided. An approximate rectangle, a substantially "口" shape, a substantially "日" shape, a substantially "目" shape or the like can be preferably exemplified as the cross-section shape when the reinforcement is cut in the longitudinal direction of the vehicle. However, in this case, the side wall surfaces that are substantially parallel in the vertical direction of the vehicle may protrude from the side wall surfaces that are substantially parallel in the longitudinal direction of the vehicle.

In addition, the reinforcement is generally formed by bending the opposite end part sides from the view point of the design of the vehicle. Also, the reinforcement of the bumper device may have the bent parts respectively on the opposite end parts. In addition, it is preferable that two impact absorbing members of the bumper device are fixed to the reinforcement in accordance with the mounting position such that one impact absorbing member can be mounted on each of the right and left vehicle body frames or the like in the longitudinal direction of the vehicle.

The fixing plate of the impact absorbing member of the bumper device may be fixed to the reinforcement by friction stir welding.

In the case of fixing the fixing plate using bolts and nuts, time-consuming pre-processing for the fixing plate and the reinforcement or the like (forming of the mounting hole and fixing of the nuts) is needed. On the other hand, in the case of fixing the fixing plate by friction stir welding, it is possible to reduce the time for mounting by the time required for the pre-processing because the pre-processing becomes unnecessary, making it possible to improve mass productivity. In addition, in the case of fixing the fixing plate by welding, there is a concern of inner defects such as blowholes, incomplete fusion or the like, and further, distortions are easily generated. On the other hand, in the case of fixing the fixing plate by friction stir welding, it is possible to save the effort of a defect inspection since it is not necessary to worry about inner defects and the generation of distortions, making it possible to improve mass productivity. In addition, in the case of fixing the fixing plate by self-piercing rivets, the fixing strength is relatively weak and a specialized tool for fixing is also needed. On the other hand, in the case of fixing the fixing plate by friction stir welding, it is possible to ensure relatively high fixing strength and further, a specialized tool is not needed. Further, in the case of fixing the fixing plate by friction stir welding, fixing members such as bolts, nuts, filler material, self-piercing rivets or the like are not needed, enabling weight savings of the bumper device. Further, it is also possible to reduce the cost of the bumper device by improvement of mass productivity and reduction of the fixing members.

Either linear friction stir welding or friction stir spot welding can be used as the friction stir welding. These two friction stir weldings also can be used in combination. In addition, the friction stir welding may be carried out from the impact absorbing part side or from the reinforcement side. The friction stir welding may be carried out from the side at which the workability can be easily ensured taking into consideration the length in the vehicle longitudinal direction of the impact absorbing part in the impact absorbing member or the like.

For the linear friction stir welding, from the standpoint of improving the resistance with respect to tensile forces by towing and lashing, the linear welding length is preferably not less than 50 mm, the linear weld width is preferably not less than 3 mm, and the linear weld area is preferably not less than 150 mm². Further, one or two or more linear welded parts of the linear friction stir welding can be formed taking into consideration the degree of resistance to be provided or the like. On the other hand, for the friction stir spot welding, the number of weld points is preferably not less than 6 from the standpoint of improving resistance with respect to tensile forces by towing and lashing.

In addition, the welding direction of the friction stir welding is not particularly limited. For the impact absorbing part of the impact absorbing member, in case the length in the vehicle longitudinal direction of the second side wall plate, which will be disposed on the inside of the vehicle in the vehicle width direction, is set to be longer than that of the second side wall plate, which will be disposed on the outside of the vehicle in the vehicle width direction, namely, in case the fixing plate is provided so as to be inclined toward the outside of the vehicle in the vehicle width direction, it is preferable that the friction stir welding is carried out from the outside of the vehicle in the vehicle width direction towards the inside of the vehicle. It is because it becomes easy to reduce unnecessary contact between the pin of a friction stir welding apparatus and the impact absorbing member at the time of friction stir welding.

Further, the impact absorbing member and bumper device can be applied to either of the front bumper side of the vehicle or to the rear bumper side of the vehicle.

EXAMPLES

Impact absorbing members and bumper devices according to the examples will be described with reference to the drawings. In all drawings, FR denotes the vehicle longitudinal direction, FRI denotes the vehicle inner side of the vehicle longitudinal direction, and FRO denotes vehicle outer side of the vehicle longitudinal direction. Further, W denotes the vehicle width direction, WI denotes the vehicle inner side of the vehicle width direction, and WO denotes the vehicle outer side of the vehicle width direction. In addition, UD denotes the vehicle vertical direction, U denotes the vehicle upper side, and D denotes the vehicle lower side. These symbols will be appropriately used in the following description. The impact absorbing members and the bumper devices of the examples are assumed to be applied to the front bumper side of the vehicle; however, not limited to this, the impact absorbing members and the bumper devices of the examples can be also applied to the rear bumper side of the vehicle.

As illustrated in FIGS. 1 to 13, FIGS. 18 to 23, FIGS. 25 to 28, and FIGS. 30 to 31, impact absorbing members (1, 5) according to below-described respective examples are configured in their entirety by bending one sheet of a metal plate material. The impact absorbing member (1, 5) includes a fixing plate (10, 50) of an approximate square shape for fixing to a reinforcement (4, 8) for reinforcing a bumper of a vehicle; an impact absorbing part (11, 51) comprising two first side wall plates (111a, 111b, 511a, 511b) of an approximate square shape, which extend towards one side substantially perpendicularly from two opposite sides of the fixing plate (10, 50), and two second side wall plates (112a, 112b, 512a, 512b) of an approximate square shape, which extend towards the side in the same direction as said one side substantially perpendicularly from the remaining two opposite sides of the fixing plate (10, 50); two flange plates (12a, 12b, 52a, 52b) for fixing to a frame of a vehicle body, and which extend substantially perpendicularly outwardly at the two first side wall plates (111a, 111b, 511a, 511b) from the side thereof opposite of the fixing plate side; and two bridge plates (13a, 13b, 53a, 53b) that bridge the gaps between the end parts of two flange plates (12a, 12b, 52a, 52b), and which extend substantially perpendicularly outwardly at the two second side wall plates (112a, 112b, 512a, 512b) from the side thereof opposite of the fixing plate side. The impact absorbing part (11, 51) is configured in an approximate square tube shape, and includes joining parts 150 (110, 510) that overlap and join opposite edge parts of the two first side wall plates (111a, 111b, 511a, 511b) with opposing edge parts of the two second side wall plates (112a, 112b, 512a, 512b) that are respectively adjacent to the opposite edge parts of the two first side wall plates (111a, 111b, 511a, 511b). Furthermore, the end parts of the two flange plates (12a, 12b, 52a, 52b) are joined to end parts of the two bridge plates (13a, 13b, 53a, 53b).

In addition, the bumper device (3, 7) according to each below-described example includes the reinforcement (4, 8) for reinforcing a bumper of a vehicle and an impact absorbing member (1, 5) according to each example; the fixing plate (10, 50) of the impact absorbing member (1, 5) is fixed to the reinforcement (4, 8). Hereinafter, the impact absorbing member and the bumper device according to each example will be described in detail.

Example 1

Figure 2:
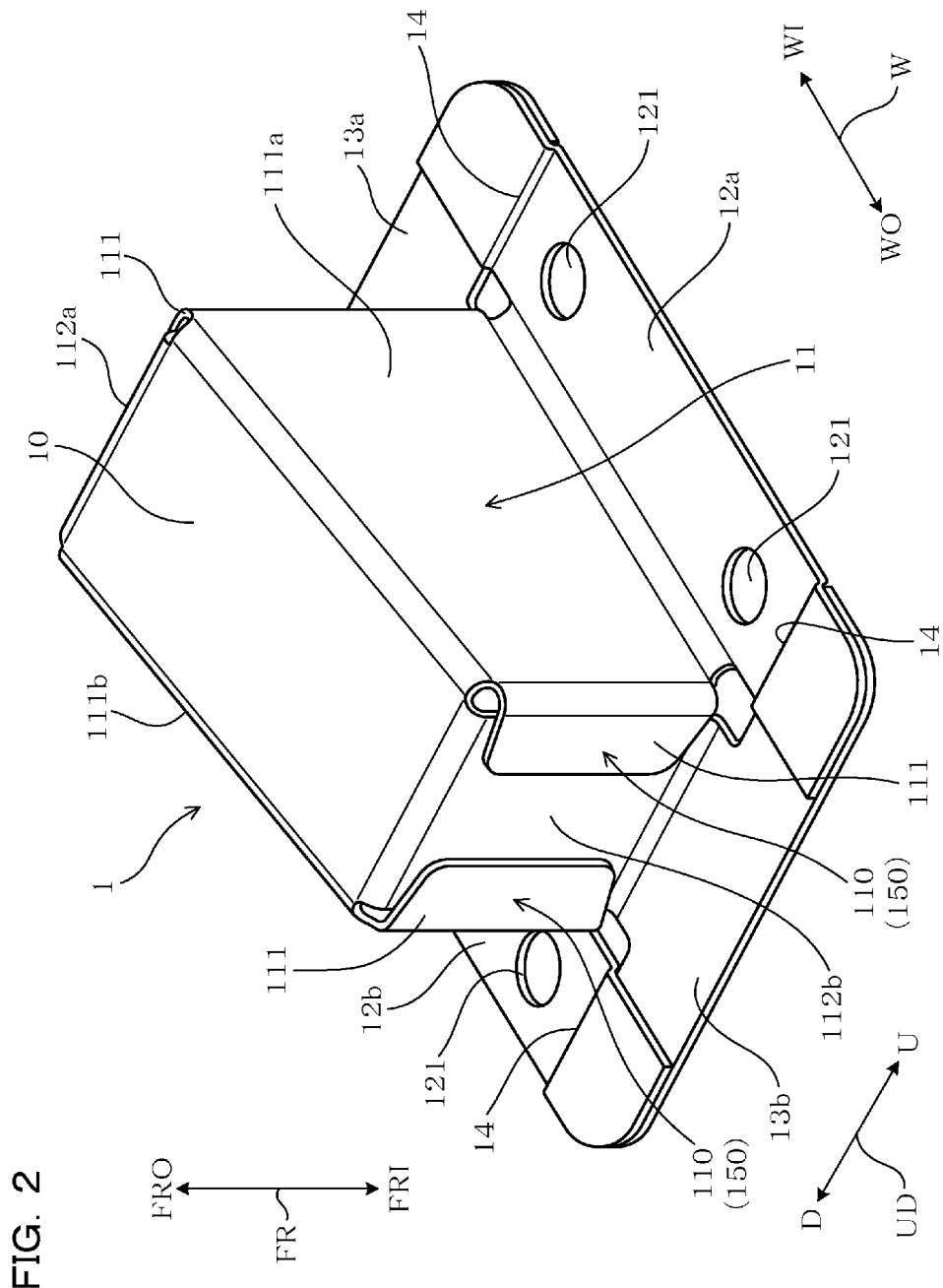
FIG. 2 is a perspective view illustrating the configuration of the impact absorbing member according to Example 1 as seen from a different angle from FIG. 1.

The impact absorbing member of Example 1 will be described with reference to FIGS. 1 to 3. As illustrated in FIGS. 1 and 2, the impact absorbing member 1 of Example 1 is entirely configured by bending one sheet of a metal plate material. In the present example, an aluminum plate material made of A6061-T6, which is a 6000 series aluminum alloy (thickness of 2.5 mm), has been used as the metal plate material. The impact absorbing member 1 includes the fixing plate 10, the impact absorbing part 11, a pair of flange plates 12a and 12b, and a pair of bridge plates 13a and 13b.

The fixing plate 10 is formed in an approximate rectangle shape and serves to fix the impact absorbing member 1 to the reinforcement 4 for reinforcing the bumper of the vehicle. The impact absorbing member 1 of the present example is used with the short side of the fixing plate 10 arranged so that it is substantially parallel to the vehicle vertical direction UD. In addition, to match a bent part 41 of the below-described reinforcement 4, the flat surface of the fixing plate 10 is inclined toward the inner side FRI of the vehicle longitudinal direction FR so as to have an angle of about 10° with the vehicle width direction W. Further, the length of the short side of the fixing plate 10 is set to be 80 mm, and the length of the inclined long side of the fixing plate 10 that projects in the vehicle width direction W is set to be 100 mm.

The impact absorbing part 11 has two first side wall plates 111a and 111b of an approximate rectangle shape and two second side wall plates 112a and 112b of an approximate rectangle shape. The first side wall plates 111a and 111b are bent substantially perpendicularly from the two opposite long sides of the fixing plate 10 toward the inner side FRI of the vehicle longitudinal direction. On the other hand, two second side wall plates 112a and 112b are bent substantially perpendicularly from the two opposite short sides of the fixing plate 10 toward the inner side FRI of the vehicle longitudinal direction. Joining margins 111 are provided on the opposite edge parts of the first side wall plates 111a and 111b and extend along the plate surfaces of the second side wall plates 112a and 112b that are adjacent to these opposite edge parts. Further, the joining margins 111 are formed by bending the opposite edge parts of the first side wall plates 111a and 111b by 90 degrees so as to extend along the plate surfaces of the second side wall plates 112a and 112b. The impact absorbing part 11 has side wall plate joining parts 110 that are formed by overlapping and joining the joining margins 111 of the first side wall plate 111a with the respective end parts of the second side wall plate 112a, 112b. In addition, the impact absorbing part 11 has side wall plate joining parts 110 that are formed by overlapping and joining the joining margins 111 of the first side wall plate 111b with the other respective end part of the second side wall plate 112a, 112b. According to the present example, after the inside surfaces of respective joining margins 111 of the first side wall plates 111a and 111b are overlapped with the outside surfaces of the second side wall plates 112a and 112b, the side wall plate joining parts 110 are joined by friction stir spot welding. According to the present example, the side wall plate joining parts 110, which will be disposed at the vehicle outer side WO of the vehicle width direction, are joined by three spot welded parts; the side wall plate joining parts 110, which will be disposed at the vehicle inner side WI of the vehicle width direction, are joined by four spot welded parts (not illustrated). In this way, the impact absorbing part 11 is configured in its entirety in an approximate square tube shape.

Further, the shape of the impact absorbing part 11, when it is cut along the vehicle width direction W, is an approximate rectangle shape having a long side 100 mm×a short side 80 mm. In addition, it is defined that the length in the vehicle longitudinal direction FR of the corners of the impact absorbing part 11 at the vehicle outer side WO of the vehicle width direction is 80 mm, and the length in the vehicle longitudinal direction FR of the corners of the impact absorbing part 11 at the vehicle inner side WI of the vehicle width direction is a length from the flange plates 12a and 12b until it almost reaches a side wall surface 42a (the mounting surface of the fixing plate 10) of the reinforcement 4. In addition, the width of the joining margin 111 is defined to be 20 mm.

Flange plate 12a of the two flange plates 12a and 12b extends substantially perpendicularly by being bent in the vehicle upper direction U from the side opposite of the fixing plate 10 on the first side wall plate 111a. The other flange plate 12b extends substantially perpendicularly by being bent in the vehicle lower direction D from the side opposite of the fixing plate 10 on the first side wall plate 111b. The flange plates 12a and 12b are formed in an approximate rectangle shape with a long side length of 170 mm and a short side length of 30 mm. Further, the impact absorbing member 1 according to the present example has mounting holes 121 that are respectively formed at the opposite end part sides in a longitudinal direction of the flange plates 12a and 12b. The flange plates 12a and 12b are fixable to the vehicle body frame (not illustrated) by inserting bolts (not illustrated) as fastening members through these mounting holes 121 and using nuts (not illustrated).

Bridge plate 13a of the two bridge plates 13a and 13b extends substantially perpendicularly by being bent at the vehicle inner side WI of the vehicle width direction from the long side opposite of the fixing plate 10 on the second side wall plate 112a. The other bridge plate 13b extends substantially perpendicularly by being bent at the vehicle outer side WO of the vehicle width direction from the long side opposite the fixing plate 10 on the second side wall plate 112b. The bridge plates 13a and 13b are formed in an approximate rectangle shape; their longitudinal length is set at a length (150 mm) so that their opposite end parts overlap with the end parts of the flange plates 12a and 12b. Further, the opposite end parts of the bridge plates 13a and 13b are arranged such that they will come into contact with the surface on the vehicle body frame side on the flange plates 12a and 12b (the opposite side of the impact absorbing part 11 side). In addition, a step part 14 is provided by bending at the end parts of the flange plates 12a and 12b taking into consideration the plate thickness of the bridge plates 13a and 13b. Thereby, the surfaces on the vehicle body frame side of the flange plates 12a and 12b and the surfaces on the vehicle body frame side of the bridge plate 13a and 13b are located on the same surface. In this state, the end parts of two flange plates 12a and 12b are respectively joined to the end parts of two bridge plates 13a and 13b by spot welding (not illustrated).

Figure 3:
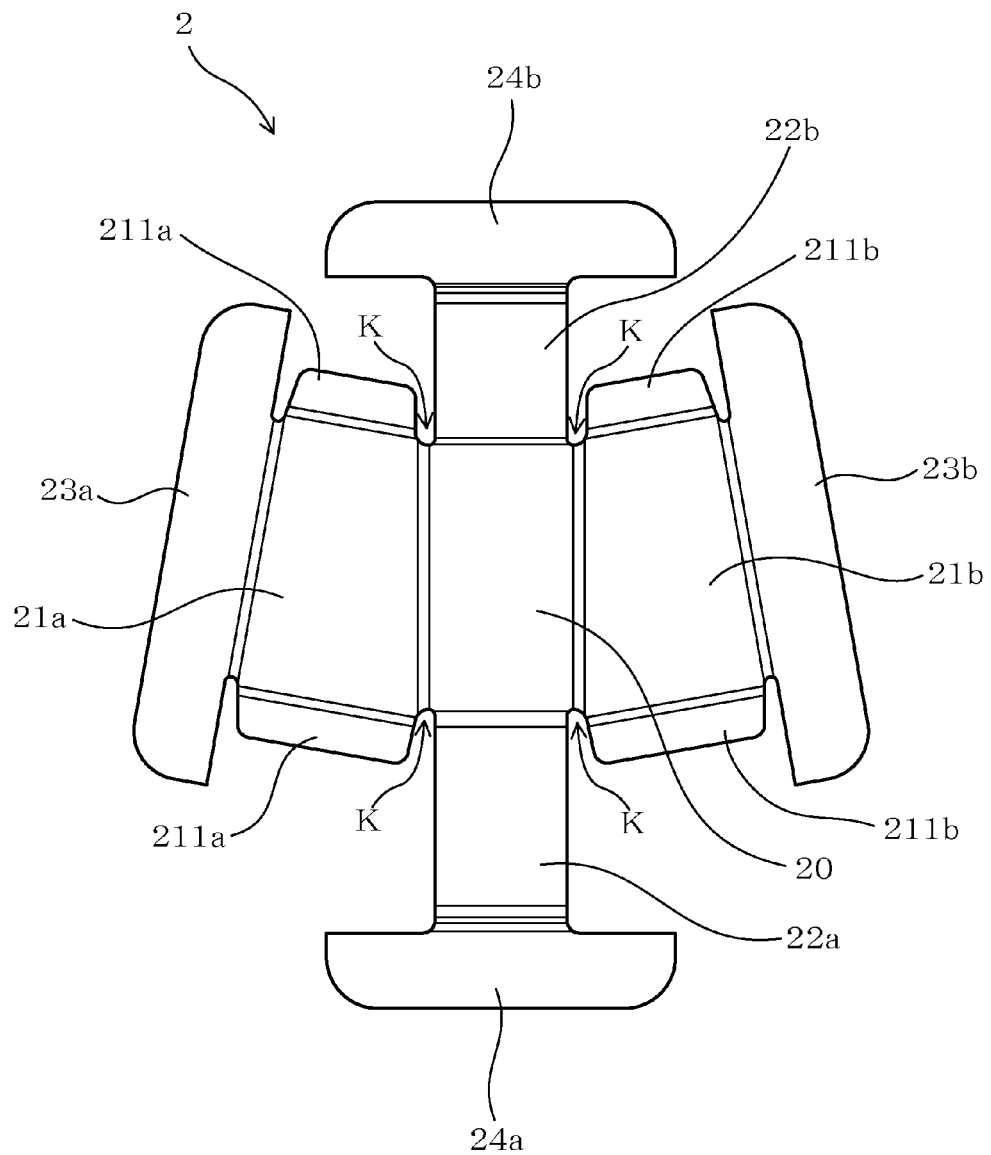
FIG. 3 is an explanatory drawing illustrating a blank for forming the impact absorbing member according to Example 1.

In FIG. 3 a blank for configuring the impact absorbing member according to Example 1 is illustrated. The impact absorbing member 1 according to the above-described Example 1 is configured by bending of the blank 2 illustrated in FIG. 3. The blank 2 is made from one sheet of an aluminum plate material (A6061-T6, proof stress 280 MPa, plate thickness 2.5 mm) and has portions corresponding to respective parts of the impact absorbing member 1. In FIG. 3, portion 20 corresponds to the fixing plate 10. Portion 21a corresponds to the first side wall plate 111a and portions 211a at the opposite edge parts thereof correspond to the joining margins 111 of the first side wall plate 111a. Portion 21b corresponds to the first side wall plate 111b and portions 211b at the opposite edge parts thereof correspond to the joining margins 111 of the first side wall plate 111b. Portion 22a corresponds to the second side wall plate 112a and a portion 22b corresponds to the second side wall plate 112b. Portion 23a corresponds to the flange plate 12a. Portion 23b corresponds to the flange plate 12b. Portion 24a corresponds to the bridge plate 13a. Portion 24b corresponds to the bridge plate 13b. These respective portions are integrally connected, and the parts illustrated with fine lines are defined as bent positions.

Further, the width of notched parts K, which are provided between the portions 211a corresponding to the joining margins 111 of the first side wall plate 111a and the portions 22a and 22b corresponding to the second side wall plates 112a and 112b and provided between the portions 211b corresponding to the joining margin 111 of the first side wall plate 111b and the portions 22a and 22b corresponding to the second side wall plates 112a and 112b, are each defined to be about 5 mm; the tip end part of the notched part K has a radius of curvature R that is defined to be 2.5-5.0 mm. The width of the notched parts K and the value of R of the distal end part of the notched part K are not limited to the above, and can be set by taking into consideration the size, etc., of the impact absorbing member 1. For example, it is possible to define the width of the notched parts K to be within the range of 3-10 mm and the value of R of the tip end part of the notched parts K to be within the range of 1.5-7.5 mm. As described above, by adjusting the notched parts K of the blank 2, the impact absorbing member 1 is provided with R at the peripheral borders of the gaps that will be formed at the connecting parts to the impact absorbing part 11 at the four corners of the fixing plate 10.

Figure 4:
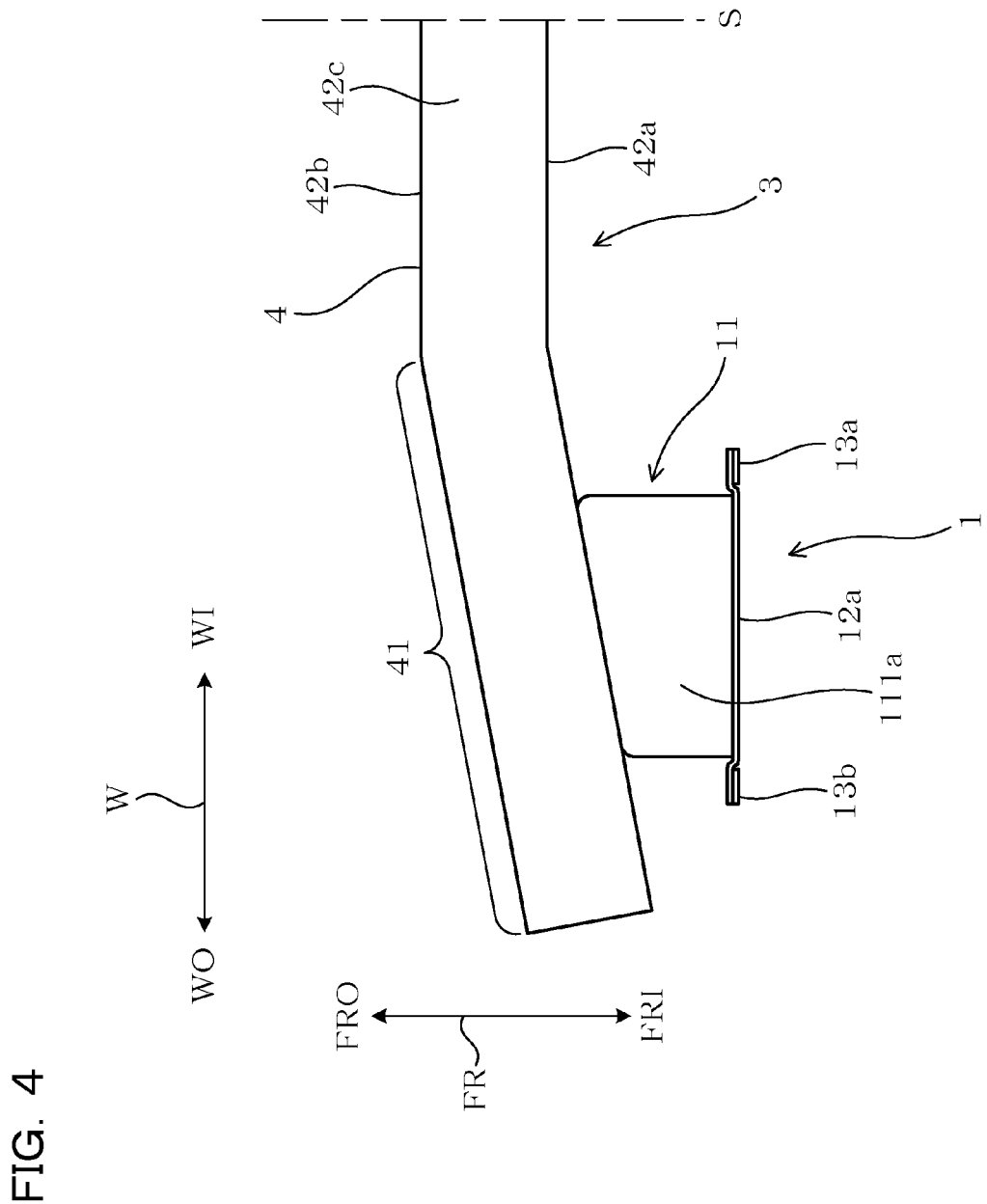
FIG. 4 is an explanatory drawing illustrating the configuration of the bumper device (in fact, in a front direction of the vehicle, namely, of the left half side when the bumper device is applied to the front bumper side) according to Example 1.

Next, the bumper device of Example 1 will be described with reference to FIGS. 4 and 5. The bumper device 3 of Example 1, as illustrated in FIG. 4, includes the reinforcement 4 for reinforcing the bumper of the vehicle and the impact absorbing member 1 of the above-described Example 1. The fixing plate 10 of the impact absorbing member 1 is fixed to the reinforcement 4. Further, FIG. 4 illustrates the left half of the bumper device 3 when the bumper device is applied to the front bumper side. On the right side of the center line S, a right half (not illustrated) in the front direction of the vehicle of the bumper device 3 exists that is symmetrical to the left half in the front direction of the vehicle of the bumper device 3. Accordingly, the bumper device 3 of the present example has two impact absorbing members 1 of the above-described Example 1.

Figure 5:
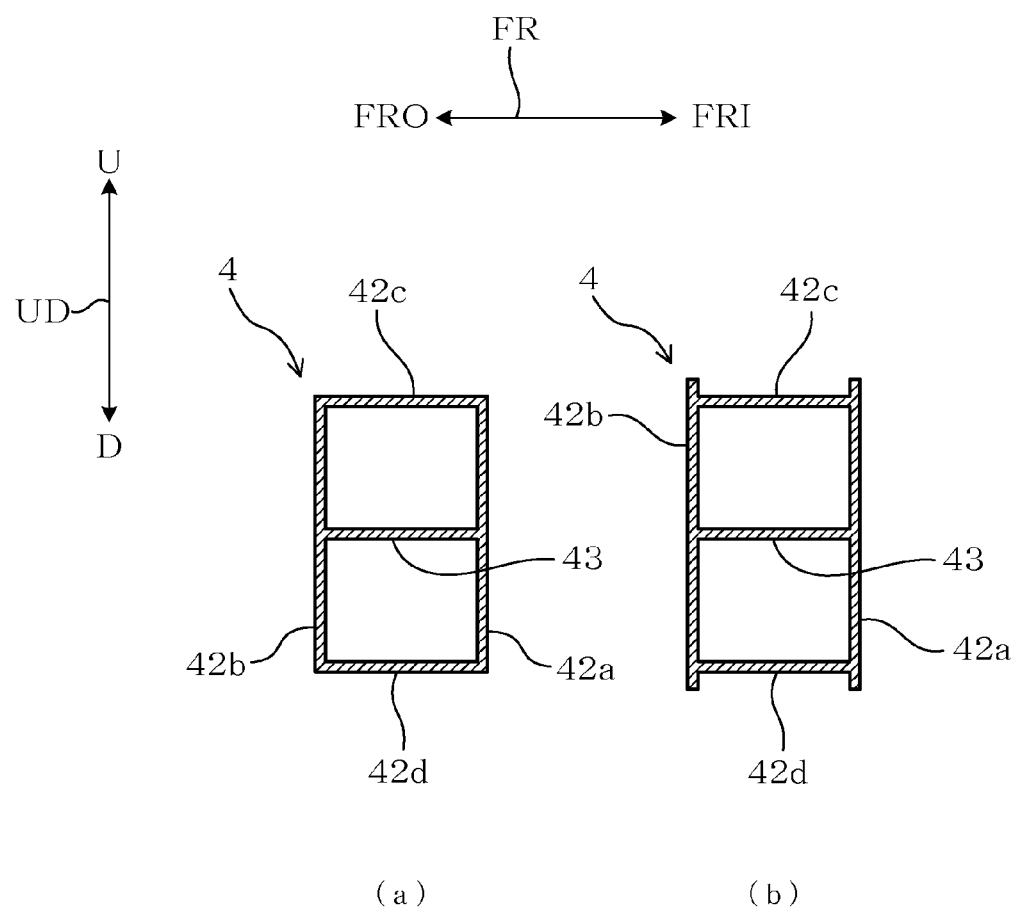
FIG. 5 is an explanatory drawing illustrating the cross-section shape of a reinforcement of the bumper device according to Example 1.

More specifically, in the bumper device 3 according to Example 1 as illustrated in FIG. 5(*a*), the reinforcement 4 is formed by an aluminum hollow-shape material that has a cross-sectional shape, when sliced in the vehicle longitudinal direction FR, in the shape of an approximate "☐". As illustrated in FIG. 5(*b*), the side wall surface 42*b* of the vehicle outer side FRO of the vehicle longitudinal direction and the side wall surface 42*a* of the vehicle inner side FRI of the longitudinal direction may protrude from the side wall surfaces 42*c* and 42*d* of the upper side U and the lower side D, respectively, of the vehicle vertical direction. Further, an extruded-shape material made from A7N01-T6 (proof stress 280 MPa) has been used as the aluminum hollow-shape material.

The reinforcement 4 includes the bent part 41 that extends in the vehicle width direction W; the opposite end part sides thereof are bent towards the inner side FRI of the vehicle longitudinal direction so as to have an angle of 10° with the vehicle width direction W. The fixing plate 10 of the impact absorbing member 1 is fixed to the side wall surface 42*a* of the inner side FRI of the vehicle longitudinal direction on the bent part 41 of the reinforcement 4. The length and thickness of the side wall surfaces 42*a* and 42*b*, which arranged in the vehicle longitudinal direction FR on the reinforcement 4, are set to 100 mm and 4 mm, respectively; the length and thickness of the side wall surfaces 42*c* and 42*d*, which are arranged in the vehicle vertical direction UD, are set to 80 mm and 2 mm, respectively; the thickness of a center rib 43 is set to 2 mm.

Here, the fixing plate 10 of the impact absorbing member 1 is fixed to the reinforcement 4 by linear friction stir welding. In the present example, the fixing plate 10 of the impact absorbing member 1 is specifically fixed to the reinforcement 4 by the following procedure. That is, the pin of the friction stir welding apparatus is inserted from the opening on the side of the flange plates 12*a* and 12*b* of the impact absorbing part 11 into the impact absorbing part 11. In this case, the pin is perpendicularly inserted at the location of the vehicle outer side WO of the vehicle width direction onto the interior side of the fixing plate 10. Subsequently, linear friction stir welding is carried out, while rotating this pin in the state of being inserted into the fixing plate 10, by moving it nearly to the vehicle inner side WI of the vehicle width direction. After that, the welding is concluded by stopping the movement of the pin, and the pin is withdrawn from the interior of the impact absorbing part 11. In the present example, the conditions of the linear friction stir welding are set such that: the dimension of the pin: shoulder diameter 16 mm, the probe diameter: tip end part 6 mm, base part 8 mm, the rotation number of the pin 750 rpm, and the traversing speed of the pin 250 mm/min. In addition, the linear weld part has a length of 80 mm and a width of 4 mm; the number of linear welded parts is set to 3 in the vertical direction of the vehicle.

With respect to the impact absorbing member 1 of Example 1 configured as described above, the part count is one; as compared to the part count of the impact absorbing member 1 having three parts that used the extruded-shape material of the prior art, it is possible to reduce the part count. In addition, the impact absorbing member 1 of Example 1 excels in mass productivity since it can be easily configured from one sheet of a metal plate material by bending and spot welding. Accordingly, it can also be said that the bumper device 3 of Example 1 that uses the impact absorbing member 1 of Example 1 makes it possible to reduce the part count and it also excels in the mass productivity.

Example 2

Figure 6:
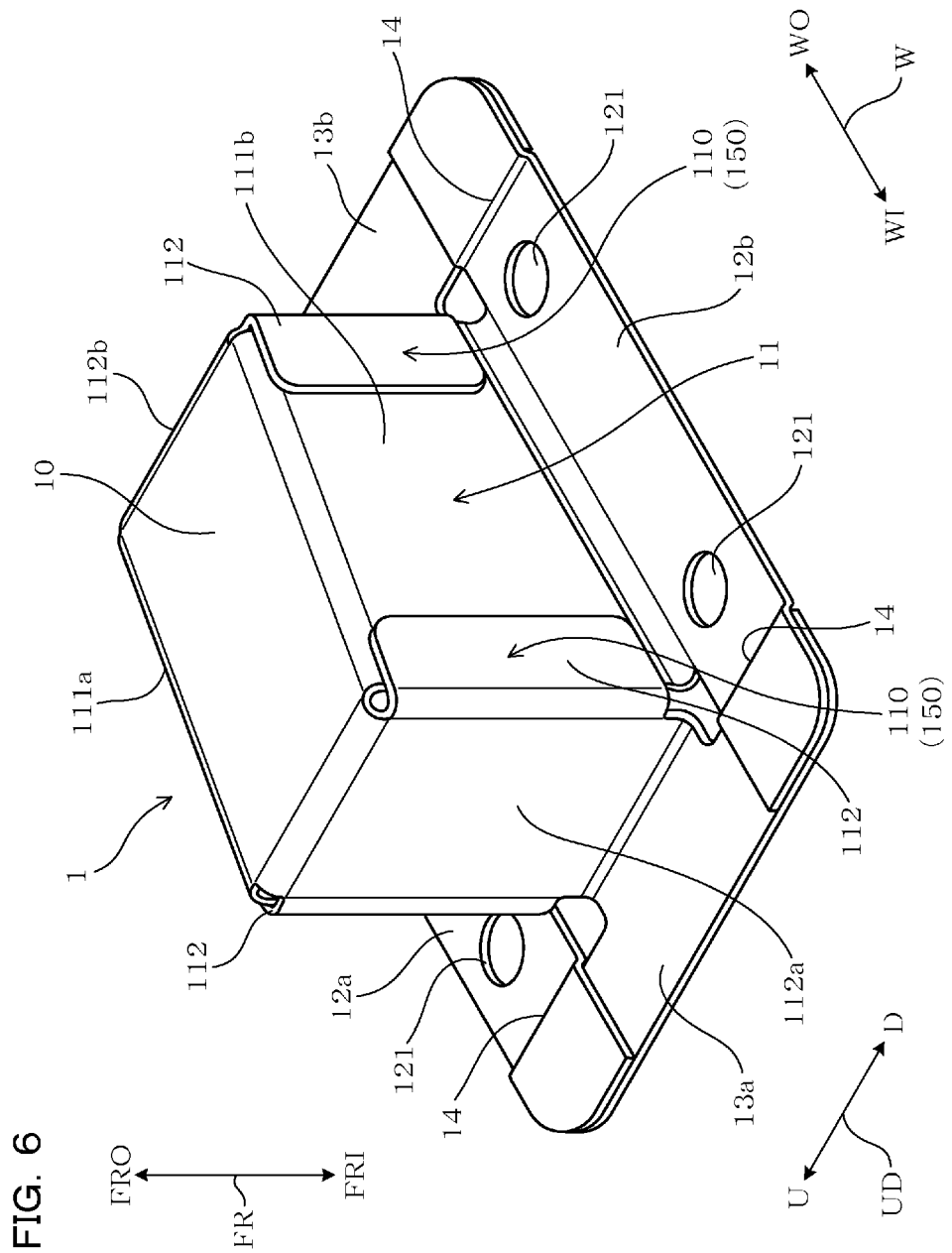
FIG. 6 is a perspective view illustrating the configuration of the impact absorbing member according to Example 2.

The impact absorbing member 1 and the bumper device 3 of Example 2 will be described with reference to FIG. 6. The impact absorbing member 1 of Example 2 is different from the impact absorbing member 1 of Example 1 in the configuration of the side wall plate joining part 110 of the impact absorbing part 11; however, other configurations thereof are similar to those of the impact absorbing member 1 of Example 1. In addition, the bumper device 3 (not illustrated) of Example 2 has the same configuration as the bumper device 3 of Example 1 except for using the impact absorbing member 1 of Example 2 in place of the impact absorbing member 1 of Example 1.

For the impact absorbing member 1 of Example 2, joining margins 112 are provided on the opposite edge parts of the second side wall plates 112*a* and 112*b* and extend along the plate surfaces of the first side wall plates 111*a* and 111*b* that are adjacent to these opposite edge parts. Further, the joining margins 112 are formed by bending the opposite edge parts of the second side wall plates 112*a* and 112*b* by 90 degrees so as to extend along the plate surfaces of the first side wall plates 111*a* and 111*b*. The impact absorbing part 11 has side wall plate joining parts 110 that are formed by overlapping and joining the joining margins 112 of the second side wall plate 112*a* with the respective edge parts of the first side wall plate 111*a*, 111*b*. In addition, the impact absorbing part 11 has side wall plate joining parts 110 that are formed by overlapping and joining the joining margins 112 of the second side wall plate 112*b* with the other respective edge parts of the first side wall plate 111*a*, 111*b*. According to the present example, after the inside surfaces of respective joining margins 112 of the second side wall plates 112*a* and 112*b* are overlapped with the outside surfaces of the first side wall plates 111*a* and 111*b*, the side wall plate joining parts 110 are joined by friction stir spot welding. According to the present example, the side wall plate joining parts 110, which will be disposed at the vehicle outer side WO of the vehicle width direction are joined by three spot welded parts (not illustrated); the side wall plate joining parts 110, which will be disposed at the vehicle inner side WI of the vehicle width direction, are joined by four spot welded parts (not illustrated). In this way, the impact absorbing part 11 is configured in its entirely in an approximate square tube shape.

The impact absorbing member 1 and the bumper device 3 of Example 2 can also achieve the same functional effects as those of the impact absorbing member 1 and the bumper device 3 of Example 1.

Example 3

Figure 7:
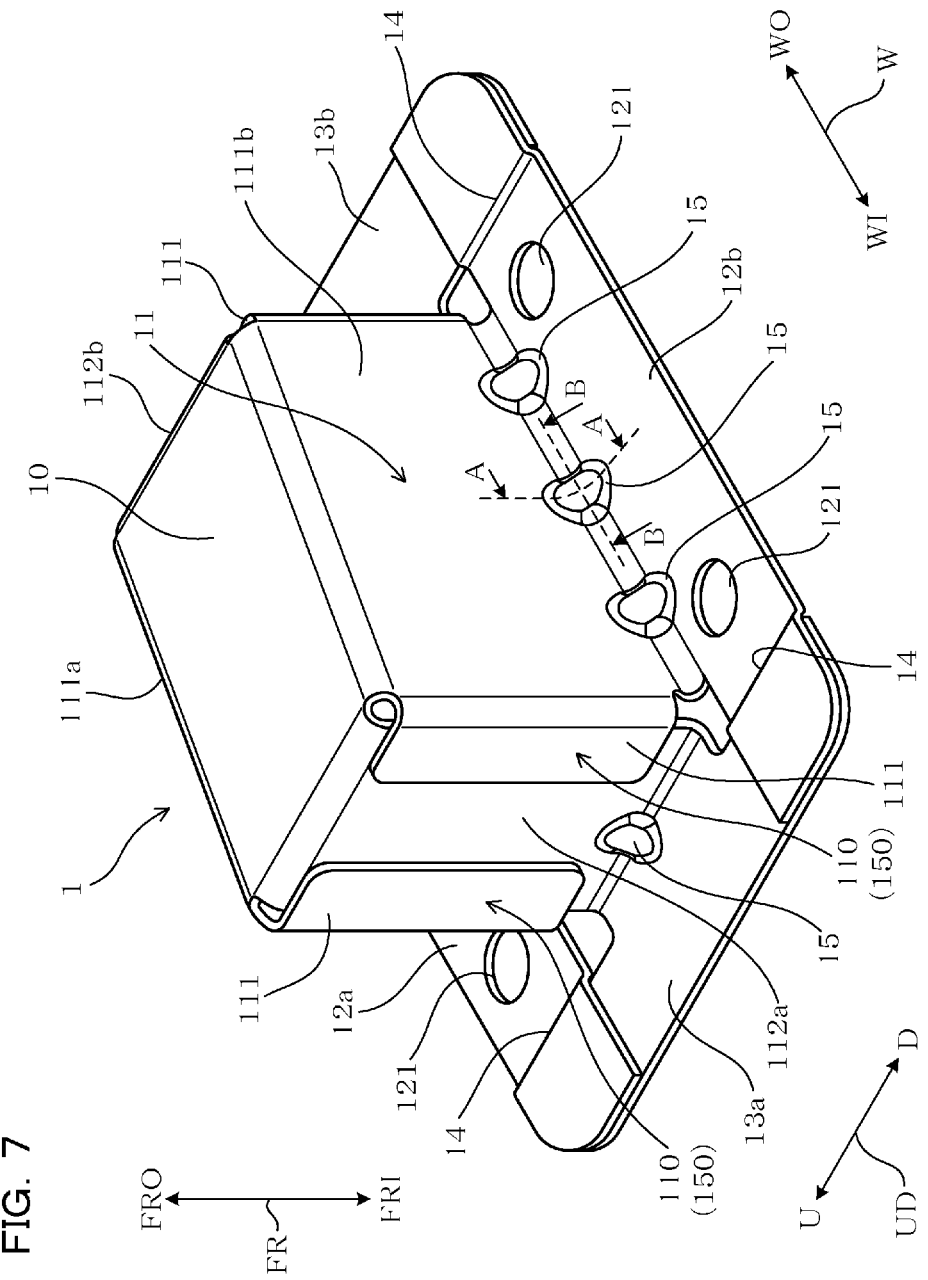
FIG. 7 is a perspective view illustrating the configuration of the impact absorbing member according to Example 3.

The impact absorbing member 1 and the bumper device 3 of Example 3 will be described with reference to FIGS. 7 to 9. The impact absorbing member 1 of Example 3 is different from the impact absorbing member 1 of Example 1 by including a plurality of bead parts 15; however, other configurations thereof are similar to those of the impact absorbing member 1 of Example 1. In addition, the bumper device 3 (not illustrated) of Example 3 has the same configuration as the bumper device 3 of Example 1 except for using the impact absorbing member 1 of Example 3 in place of the impact absorbing member 1 of Example 1.

According to the impact absorbing member 1 of Example 3, three bead parts 15 are formed at the intersecting part of the first side wall plates 111*a* and 111*b* and the flange plates 12*a* and 12*b* connected to the first side wall plates 111*a* and 111*b*; one bead part 15 is formed at the intersecting part of the second side wall plates 112*a* and 112*b* and the bridge plates 13*a* and 13*b* connected to the second side wall plates 112*a* and 112*b*. Further, the pitch between each bead part 15 at the intersecting part of the first side wall plates 111*a* and 111*b* and the flange plates 12a and 12b is set to 25 mm. In addition, the bead parts 15 at the intersecting part of the second side wall plates 112a and 112b and the bridge plates 13a and 13b, respectively, are formed nearly at the center of the intersecting parts.

Figure 8:
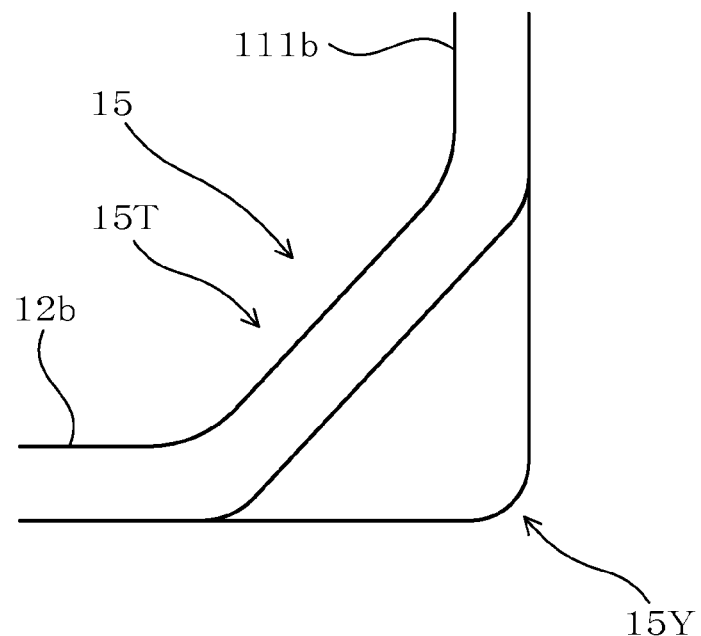
FIG. 8 is a sectional view illustrating the configuration of the A-A section in FIG. 7.
Figure 9:
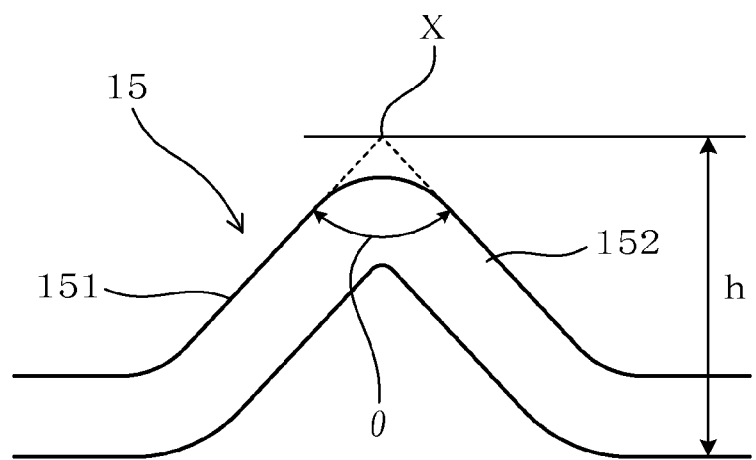
FIG. 9 is a sectional view illustrating the configuration of the B-B section in FIG. 7.

As illustrated in FIG. 8, the bead part 15 is configured by a bulging part that is caused to bulge out by plastic-deformation of the intersecting part from a mountain fold side 15Y of the intersecting part formed by bending towards a valley fold side 15T thereof. Further, in the present example, the bead part 15 has been formed by die forming. In addition, as illustrated in FIG. 9, when cut by a plane having angle made with the flange plates 12a and 12b of 45°, the plane including the intersecting part of the first side wall plates 111a and 111b and the flange plates 12a and 12b, the cut surface of the bead part is formed as an approximate triangle shape. The angle made by a surface 151 and a surface 152 to form the bead part 15 (apex angle $\theta$) is set to 90 degrees. In addition, the distance h from the intersecting part to the apex X of the approximate triangle is set to about 7 mm. Further, the bead parts 15 formed at the intersecting part of the second side wall plates 112a and 112b and the bridge plates 13a and 13b are defined to be similarly configured.

The impact absorbing member 1 and the bumper device 3 of Example 3 can also achieve the same functional effects as those of the impact absorbing member 1 and the bumper device 3 of Example 1. Further, by including the bead parts 15, the impact absorbing member 1 of Example 3 excels in resistance to deformation at the intersecting parts of the first side wall plates 111a and 111b and the flange plates 12a and 12b and the intersecting parts of the second side wall plates 112a and 112b and the bridge plates 13a and 13b. Therefore, a bumper device 3 of Example 3 that uses this impact absorbing member 1 is capable of exhibiting favorable towing properties.

Example 4

Figure 10:
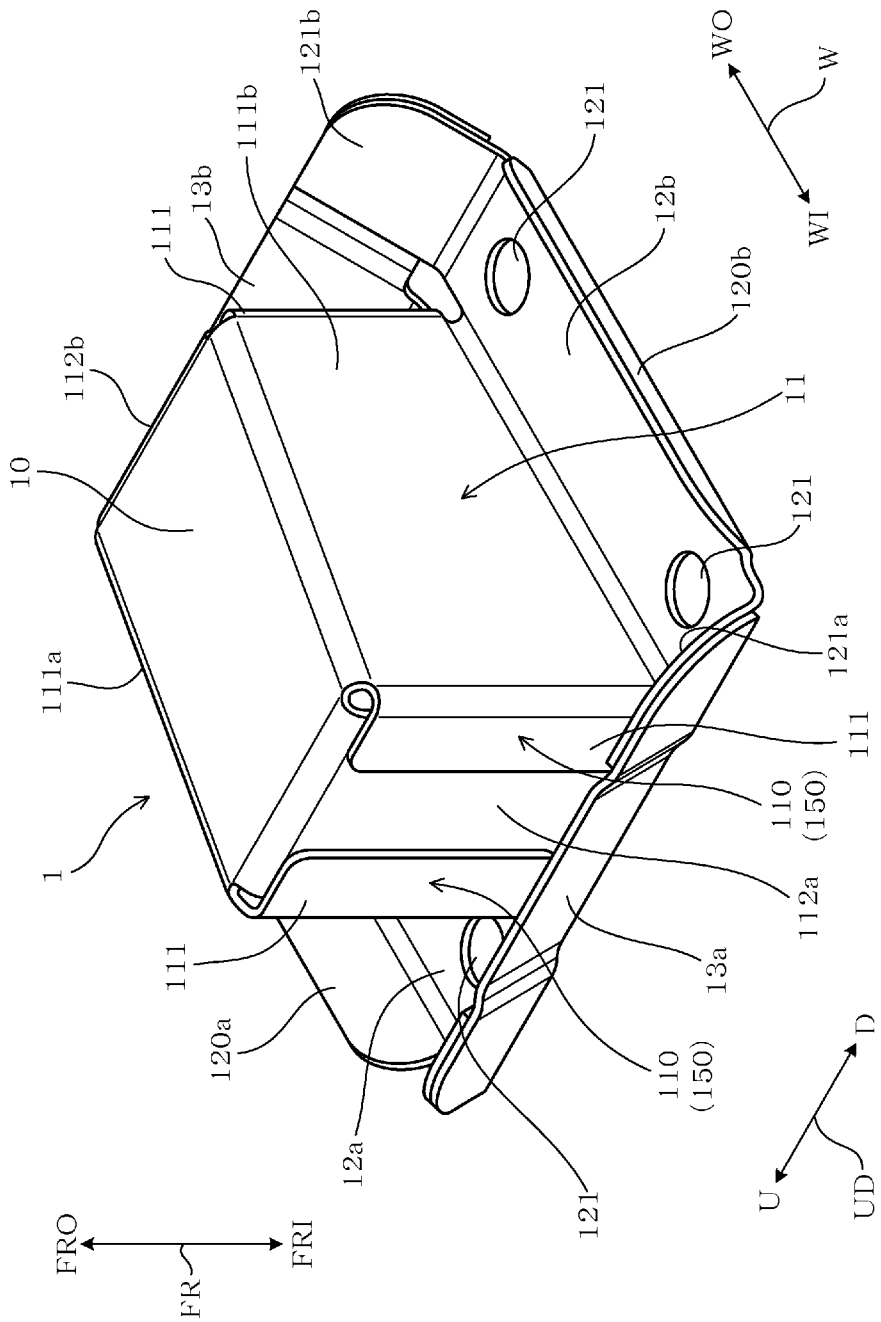
FIG. 10 is a perspective view illustrating the configuration of the impact absorbing member according to Example 4.

The impact absorbing member 1 and the bumper device 3 according to Example 4 will be described with reference to FIG. 10 and FIG. 11. The impact absorbing member 1 of Example 4 is different from the impact absorbing member 1 of Example 1 by including the below-described bent pieces 120a and 120b and bent pieces 121a and 121b; however, other configurations thereof are similar to those of the impact absorbing member 1 of Example 1. In addition, the bumper device 3 (not illustrated) of Example 4 has the same configuration as the bumper device 3 of Example 1 except for using the impact absorbing member 1 of Example 4 in place of the impact absorbing member 1 of Example 1.

According to the impact absorbing member 1 of Example 4, the bent pieces 120a and 120b are formed by outwardly extending projecting pieces that project from the sides of the flange plates 12a and 12b opposite the first side wall plates 111a and 111b and by bending these projecting pieces towards the impact absorbing part 11 side. The lengths in the longitudinal direction of the bent pieces 120a and 120b are shorter than the distance between the joined parts with the bridge plates 13a and 13b that are formed at the opposite end parts of the flange plates 12a and 12b.

In addition, the bent pieces 121a and 121b are formed by bending the flange plates 12a and 12b and the bridge plates 13a and 13b themselves towards the impact absorbing part 11 side at a position that is slightly inward of the attachment point of the bridge plates 13a and 13b with the opposite end parts in the longitudinal direction of the flange plates 12a and 12b.

The angles made by the flange plates 12a and 12b at the impact absorbing part 11 side and the bent pieces 120a and 120b are each set to 120 degrees. In addition, the angles made by the non-bent plate surfaces of the flange plates 12a and 12b at the impact absorbing part 11 side and the bent pieces 121a and 121b are also each set to 120 degrees.

Figure 11:
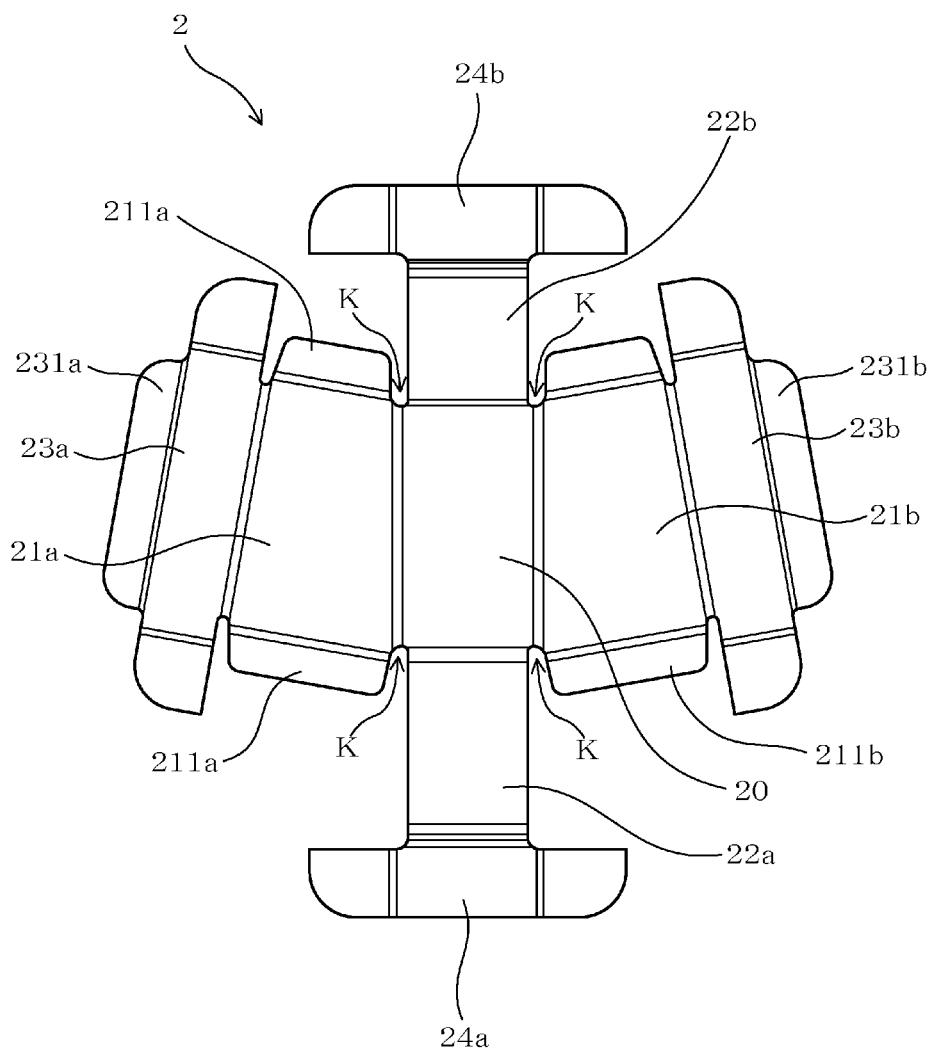
FIG. 11 is an explanatory drawing illustrating a blank for forming the impact absorbing member according to Example 4.

In FIG. 11 a blank for forming the impact absorbing member of Example 4 is illustrated. The impact absorbing member 1 of the above-described Example 4 was configured by bending of the blank 2 illustrated in FIG. 11. Although the blank 2 of FIG. 11 basically has the same configuration as the blank 2 of FIG. 3 for forming the impact absorbing member 1 of Example 1, it differs in the following points. That is, portion 23a corresponds to the flange plate 12a; projecting piece 231a corresponding to the bent piece 120a is provided at the outer side of portion 23a; portion 23b corresponds to the flange plate 12b; projecting piece 231b corresponding to the bent piece 120b is provided at the outer side of portion 23b; portion 24a corresponds to the bridge plate 13a; portion 24b corresponds to the bridge plate 13b. These respective portions are integrally connected, and the parts illustrated with fine lines are defined as bent positions.

The impact absorbing member 1 and the bumper device 3 of Example 4 can also achieve the same functional effects as those of the impact absorbing member 1 and the bumper device 3 of Example 1. Further, the resistance to deformation of the impact absorbing member 1 of Example 4 can be improved and the rigidities of the flange plates 12a and 12b and the bridge plates 13a and 13b are increased by including the bent pieces 120a and 120 and bent pieces 121a and 121b. Therefore, a bumper device 3 of Example 4 that uses this impact absorbing member 1 can exhibit favorable towing properties.

Example 5

Figure 12:
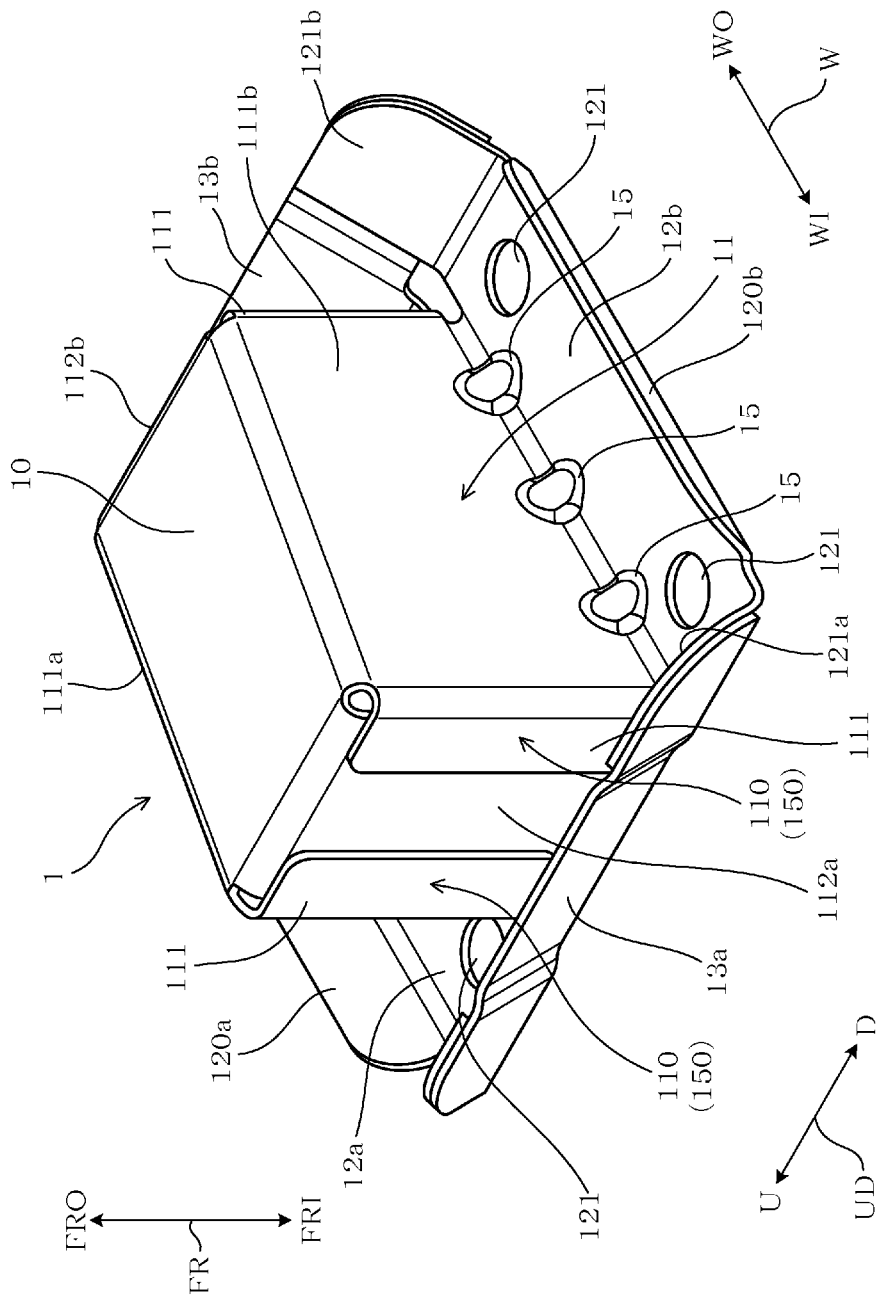
FIG. 12 is a perspective view illustrating the configuration of the impact absorbing member according to Example 5.
Figure 13:
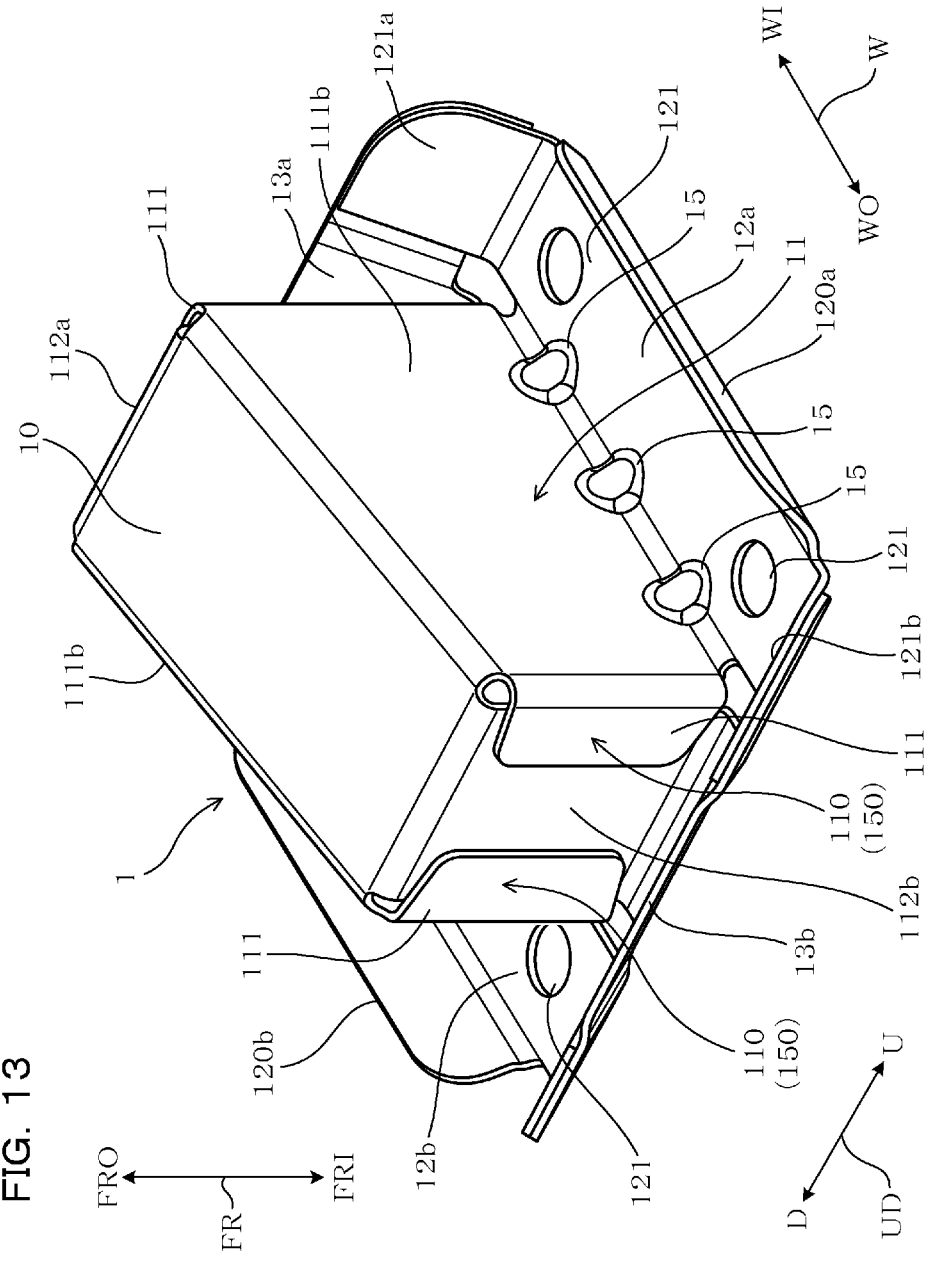
FIG. 13 is a perspective view illustrating the configuration of the impact absorbing member according to Example 5 as seen from a different angle from FIG. 12.

The impact absorbing member 1 and the bumper device 3 of Example 5 will be described with reference to FIGS. 12 and 13. The impact absorbing member 1 of Example 5 is configured by forming the bead parts 15, which are included in the impact absorbing member 1 of the above-described example 3, on the impact absorbing member 1 of Example 4. However, the vicinities of the intersecting parts of the bridge plates 13a and 13b and the second side wall plates 112a and 112b are bent in the impact absorbing member 1 of Example 5. Therefore, no bead part 15 is formed at the intersecting part of the second side wall plates 112a and 112b and the bridge plates 13a and 13b connected to the second side wall plates 112a and 112b. Other configurations are similar to those of the impact absorbing member 1 of Example 4. In addition, the bumper device 3 (not illustrated) of Example 5 has the same configuration as the bumper device 3 of Example 1 except for using the impact absorbing member 1 of Example 5 in place of the impact absorbing member 1 of Example 1.

The impact absorbing member 1 and the bumper device 3 of Example 5 can also achieve the same functional effects as those of the impact absorbing member 1 and the bumper device 3 of Example 1. Further, the impact absorbing member 1 of Example 5 includes the bead parts 15 and the bent pieces 120a, 120b, 121a, and 121b. Therefore, as a result of the synergetic effects of these two strengthening features, the resistance to deformation is improved with respect to a towing load. Therefore, the bumper device 3 of Example 5 that uses this impact absorbing member 1 can exhibit superior towing properties.

<Collision Performance Evaluation>

Hereinafter, a collision performance evaluation for the bumper device 3 of Example 5 was carried out by running a simulation using commercially-available FEM analysis software.

First, an analysis model was prepared by converting the bumper device 3 of Example 5 into a mesh model. Next, the following properties were input into the analysis model. That is, assuming that the reinforcement 4 is made of a hollow-shape material made from an aluminum alloy having a proof stress of 320 MPa (A7N01-T6) and the impact absorbing member 1 is made from an aluminum alloy having a proof stress of 280 MPa (A6061-T6), stress-strain characteristics taking into account the respective proof stresses were input into the analysis model. In addition, the above-described shapes and sizes of respective portions were applied.

Figure 14:
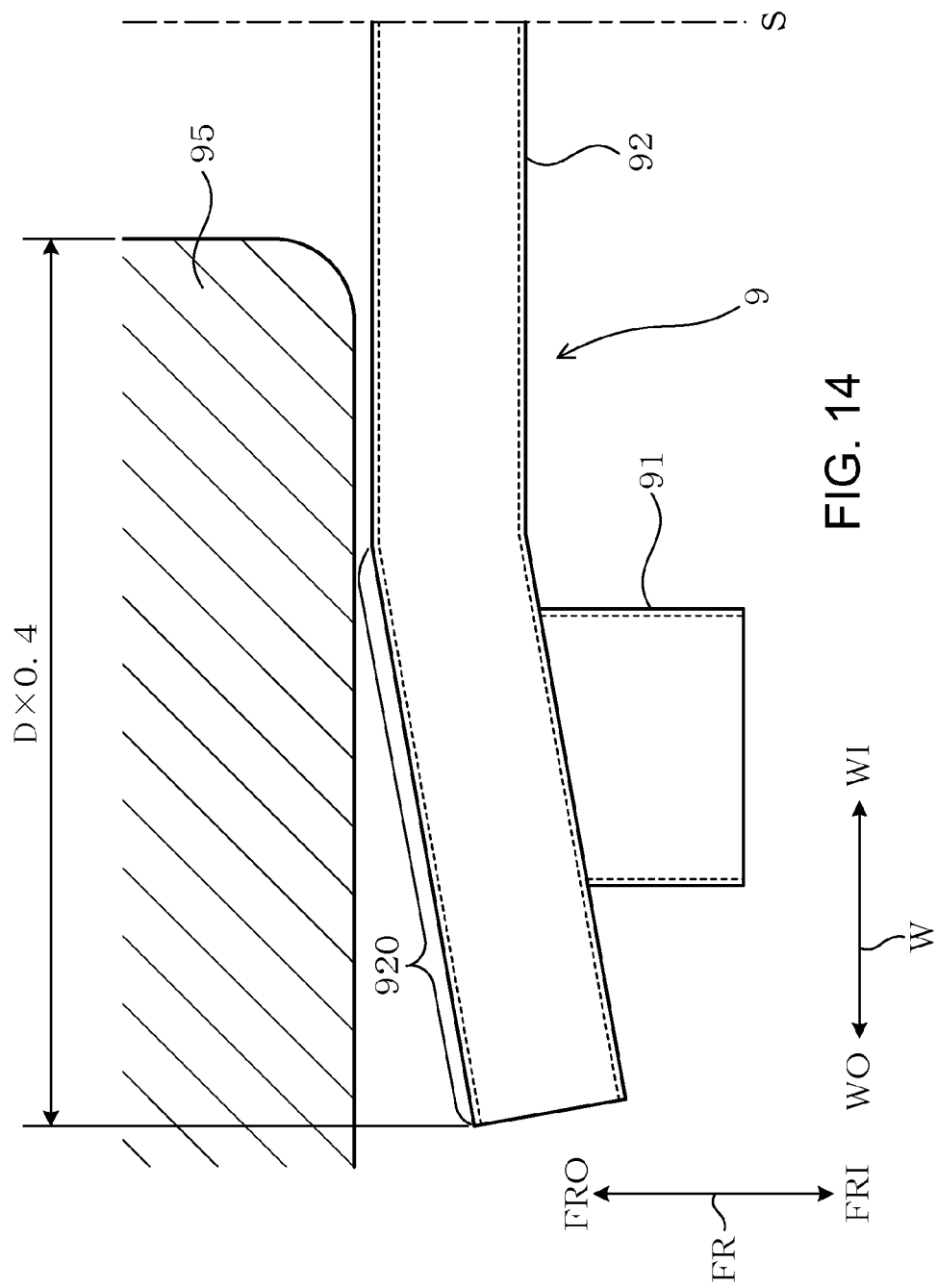
FIG. 14 is an explanatory drawing illustrating the gist of a method of evaluating collision performance by simulation.

Next, as illustrated in FIG. 14, a simulation, which collided the load jig 95 converted into the mesh model, was performed with the above-described characteristics input into the analysis model. Further, the bumper device 9 in FIG. 14 will be used for explaining the evaluation method. A condition referred to as an offset deformable barrier (ODB) was input into the analysis model as an analysis condition. Specifically, a simulation that outputs a reaction force on the load jig 95 by the collision against the bumper device 9 with respect to the amount of deformation of the load jig 95 was performed by completely restraining the end part of the vehicle body frame side of the impact absorbing member 91 on the bumper device 9 and colliding the load jig 95 against an area of 40% of the entire length D of the reinforcement 92 at a speed setting of 1000 mm/s.

As a comparison, by using as the impact absorbing part an extruded-shape material (A6061-T6, proof stress 280 MPa) having the same outer shape dimensions as the impact absorbing part 11 of the impact absorbing member 1 of Example 5, a bumper device was manufactured by linearly welding the entire circumference of the end part on the one side of this extruded-shape material to a fixing plate (A6061-T6, thickness 2.5 mm) and by welding the entire circumference of the end part on the other side of this extruded-shape material to a flange plate (A6061-T6, thickness 2.5 mm). The same simulation as the above-described one was performed with this bumper device identified as Comparative Example 1.

Figure 15:
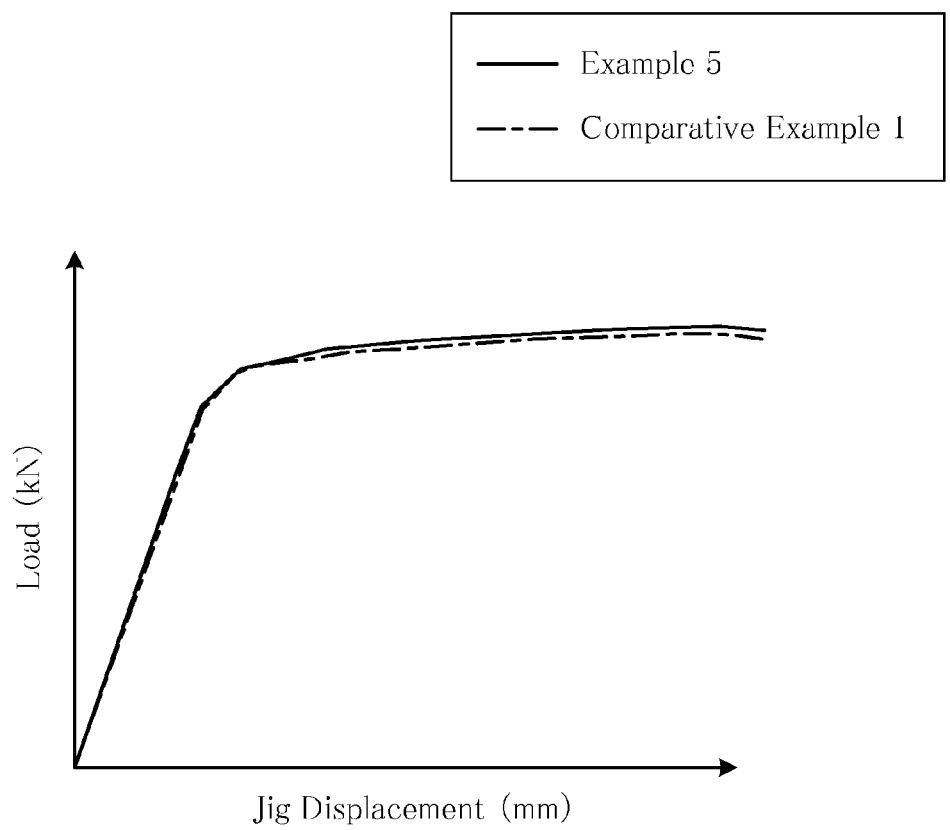
FIG. 15 illustrates simulation results showing the relationship between jig displacement and load according to Example 5.

The simulation results are illustrated in FIG. 15. In FIG. 15, the impact energy absorption amount can be calculated by the amount of displacement of the load jig 95×the area of the load. As illustrated in FIG. 15, with respect to the bumper device 3 of Example 5, the impact is reliably transmitted to the impact absorbing member 1, and the impact absorbing member 1 appropriately undergoes buckling-deformation in the vehicle longitudinal direction. Thus, it has been confirmed that the impact absorbing member, which is entirely configured by bending from one sheet of a metal plate material, also can exhibit the same impact absorption properties as the bumper device of Comparative Example 1.

Moreover, while the part count of the bumper device of Comparative Example 1 is three, the part count of the bumper device 3 of Example 5 is one; thus, the number of parts can be reduced. In addition, although three components must be integrated by linear welding when configuring the impact absorbing member for the bumper device of Comparative Example 1, the impact absorbing member 1 for the bumper device 3 of Example 5 can be easily configured by bending from one sheet of a metal plate and spot welding; thus, it excels in mass productivity.

As described above, the impact absorbing member and the bumper device of Example 5 exhibit favorable impact absorption properties, can reduce the part count, and also ensure favorable mass productivity. Further, the bead part and the bent piece of the impact absorbing member of Example 5 have almost no effect on the impact absorption properties. Therefore, it is readily conceivable that the impact absorbing members and the bumper devices of Examples 1 to 4 also can achieve the same results as above.

<Towing Properties Evaluation>

Hereinafter, a towing properties evaluation for the bumper device 3 of Example 5 was carried out by running a simulation by using commercially-available FEM analysis software.

First, an analysis model was made by converting the bumper device 3 of Example 5 into a mesh model. Next, the following properties were input into the analysis model. That is, assuming that the reinforcement 4 is made from a hollow-shape material of an aluminum alloy having a proof stress of 320 MPa (A7N01-T6) and the impact absorbing member 1 is made from an aluminum alloy having a proof stress of 280 MPa (A6061-T6), stress-strain characteristics taking into consideration the respective proof stresses were input into the analysis model. In addition, the above-described shapes and sizes of the respective parts were applied. Further, the bumper device of Comparative Example 1 was used as a comparison.

Figure 16:
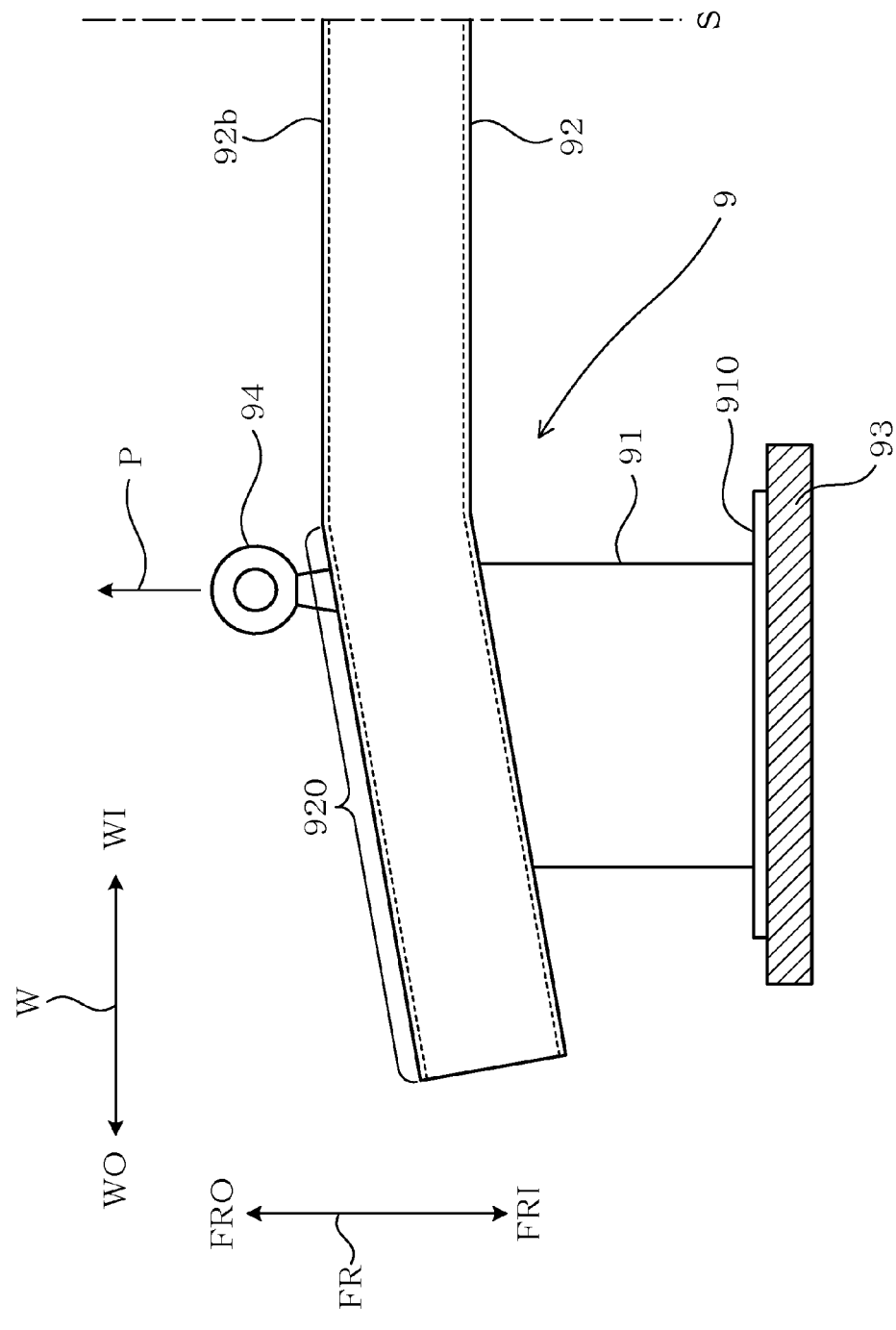
FIG. 16 is an explanatory drawing illustrating the gist of a method of evaluating towing properties by simulation.

Next, as illustrated in FIG. 16, a simulation for investigating the towing properties was run with the above-described characteristics input into the analysis model. Further, the bumper device 9 in FIG. 16 will be used for explaining the evaluation method. Specifically, a towing hook 94 was assumed to be attached to a side wall surface 92*b* of the vehicle outer side FRO of the vehicle longitudinal direction on a bent part 920 of a reinforcement 92, and this position was subjected to a forced displacement (displacement in the direction of the outer side FRO of the vehicle longitudinal direction, in the direction of arrow P in FIG. 16) at a speed setting of 100 mm/s. In FIG. 16, reference number 93 denotes a rigid body that simulates the vehicle body frame. A flange plate 910 is fastened to this rigid body 93 by bolts and nuts (not illustrated). Further, in the evaluation of the present example, respective bead parts 15 are present between the mounting holes 121 of the two bolts installed in the flange plates 12*a* and 12*b*.

Figure 17:
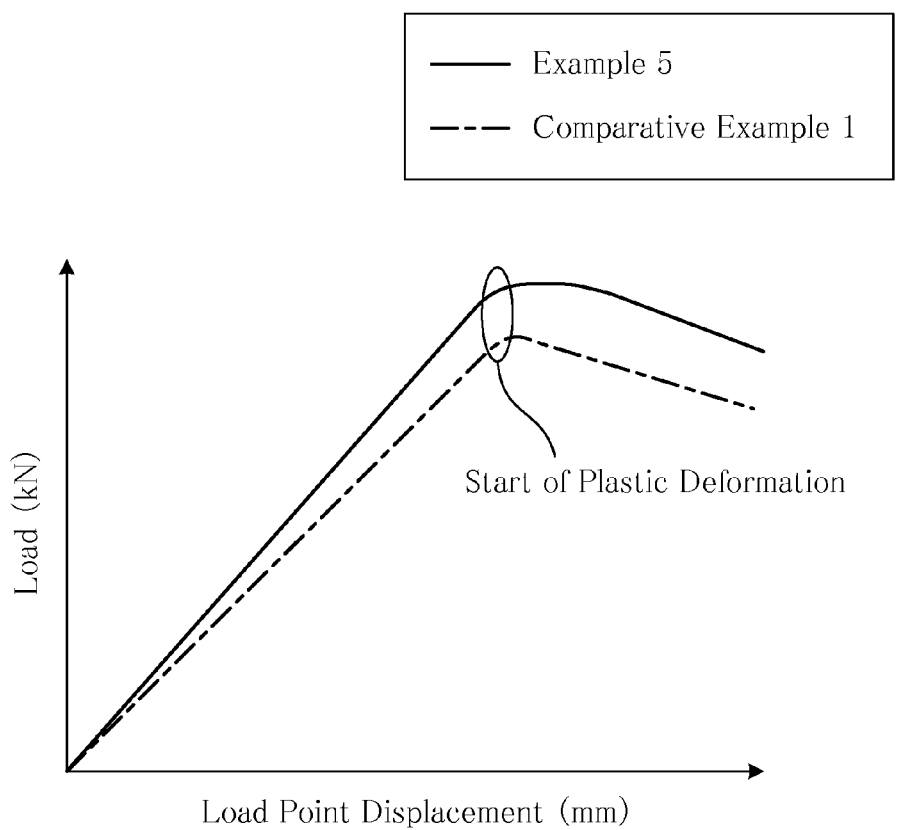
FIG. 17 illustrates simulation results showing the relationship between load point displacement and load according to Example 5.

The simulation results are illustrated in FIG. 17. FIG. 17 illustrates the relationship between load point displacement and load, and the amount of displacement amount at the start of the plastic-deformation can be obtained from this Figure. As illustrated in FIG. 17, the bumper device 3 of Example 5 is understood as having a lesser amount of displacement than the bumper device of Comparative Example 1 when the same load is applied. In addition, the load that initiates the plastic-deformation is understood to be higher for the bumper device 3 of Example 5 than the bumper device of Comparative Example 1. From these results, it has been confirmed that the bumper device 3 of Example 5, which uses such an impact absorbing member 1, is more difficult to deform with respect to the towing load due to the synergetic effects of the bead part 15 and the bent pieces 120*a*, 120*b*, 121*a*, and 121*b* for the impact absorbing member 1, and it can exhibit superior towing properties.

Example 6

Figure 18:
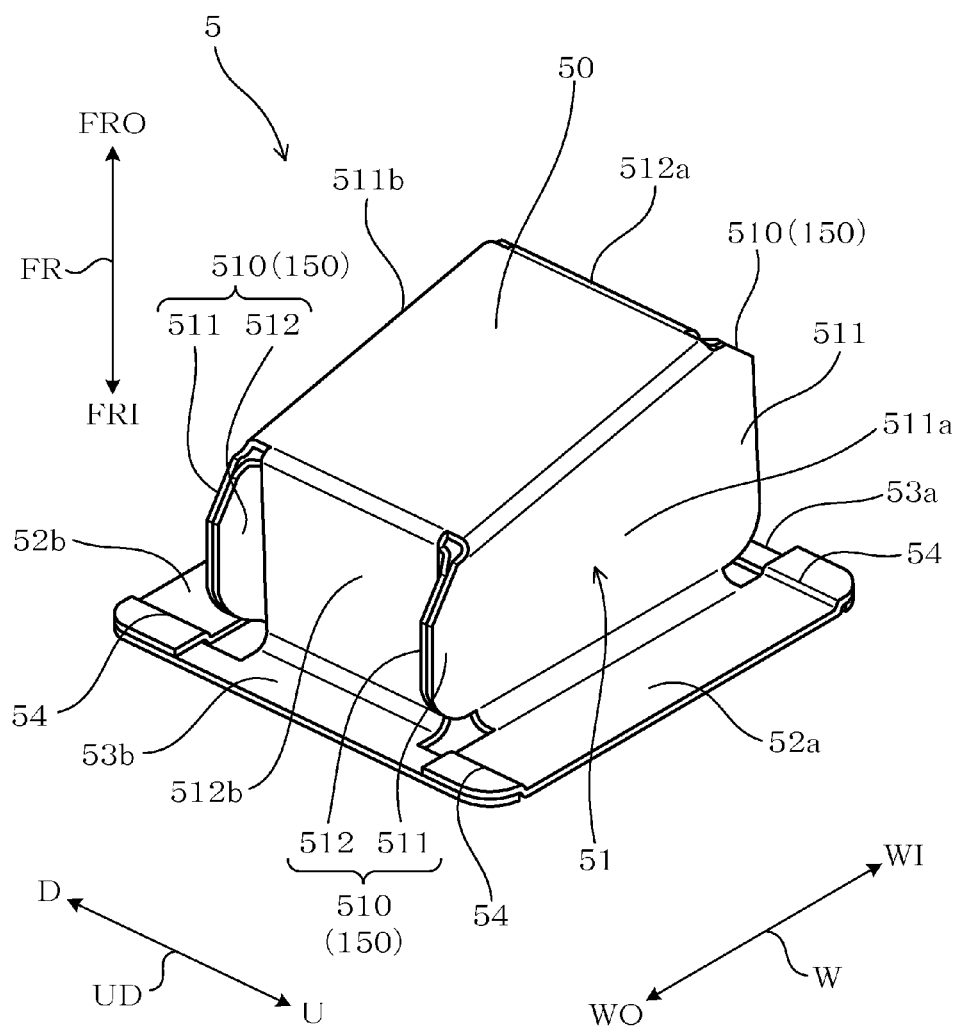
FIG. 18 is a perspective view illustrating the configuration of the impact absorbing member according to Example 6.
Figure 19:
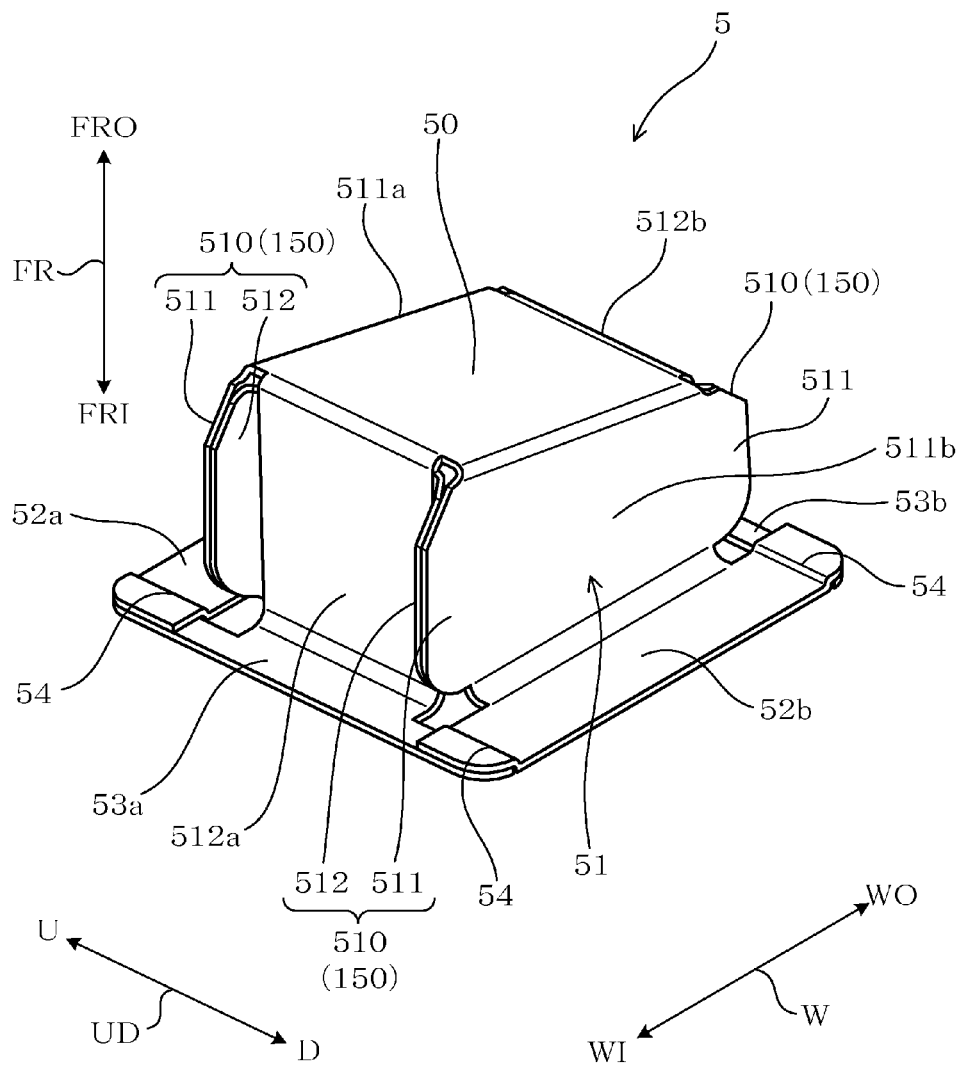
FIG. 19 is a perspective view illustrating the configuration of the impact absorbing member according to Example 6 as seen from a different angle from FIG. 18.

The impact absorbing member of Example 6 will be described with reference to FIGS. 18 to 20. As illustrated in FIGS. 18 and 19, the impact absorbing member 5 of Example 6 is entirely configured by bending one sheet of a metal plate material. In the present example, an aluminum plate material (thickness 2.5 mm) made from A6061-T6, which is a 6000 series aluminum alloy, was used as the metal plate material. The impact absorbing member 5 includes the fixing plate 50, the impact absorbing part 51, a pair of flange plates 52a and 52b, and a pair of bridge plates 53a and 53b.

The fixing plate 50 is formed in an approximate rectangle shape and is for fixing to the reinforcement 8 for reinforcing the bumper of the vehicle. The impact absorbing member 5 of the present example is used with the short side of the fixing plate 50 disposed so as to be substantially parallel to the vehicle vertical direction UD. In addition, the flat surface of the fixing plate 50 is inclined towards the inner side FRI of the vehicle longitudinal direction FR so as to form an angle of about 10° with the vehicle width direction to match a bent part 81 of the below-described reinforcement 8. Further, the length of the short side of the fixing plate 50 is set to be 80 mm, and the length of the inclined long side of the fixing plate 50 that projects in the vehicle width direction W is set to be 100 mm.

The impact absorbing part 51 has two first side wall plates 511a and 511b of an approximate rectangle shape and two second side wall plates 512a and 512b of an approximate rectangle shape. The first side wall plates 511a and 511b are bent substantially perpendicularly from the two opposite long sides of the fixing plate 50 towards the vehicle inner side FRI of the vehicle longitudinal direction. On the other hand, two second side wall plates 512a and 512b are bent substantially perpendicularly from the two opposite short sides of the fixing plate 50 towards the vehicle inner side FRI of the vehicle longitudinal direction. Joining margins 511 are provided on the opposite edge parts of the first side wall plates 511a and 511b and joining margins 512 are also provided on the opposite edge parts of the second side wall plates 512a and 512b. The impact absorbing part 51 has flange-shaped joining parts 510 formed by overlapping and joining the joining margins 511 and the joining margins 512 of the first side wall plate 511a and the adjacent second side wall plates 512a and 512b (the first side wall plate 511b and the adjacent second side wall plates 512a and 512b). According to the present example, in the flange-shaped joining parts 510, after the inside surfaces of respective joining margins 512 of the second side wall plates 512a and 512b, which have been substantially perpendicularly bent, are overlapped with the inside surfaces of joining margins 511 of the first side wall plates 511a and 511b that are not bent, the inside surfaces of respective joining margins 512 of the second side wall plates 512a and 512b are joined to the inside surfaces of joining margins 511 of the first side wall plates 511a and 511b by friction stir spot welding. In this case, the flange-shaped joining parts 510, which will be disposed on the vehicle width direction outer side WO of the vehicle width direction, are joined by three spot welded parts; the flange-shaped joining parts 510, which will be disposed on the vehicle inner side WI of the vehicle width direction, are joined by four spot welded parts. In this way, the impact absorbing part 51 includes the flange-shaped joining parts 510 that outwardly project from each corner and is configured in its entirety in an approximate square tube shape except for the flange-shaped joining parts 510.

Further, the shape of the impact absorbing part 51, when it is cut along the vehicle width direction W, is an approximate rectangle shape having a long side 100 mm×a short side 80 mm (other than the flange-shaped joining part 510). In addition, it is defined that the length in the vehicle longitudinal direction FR of the corners (the base end portion of the flange-shaped joining part 510, hereinafter omitted) of the impact absorbing part 51 at the vehicle inner side WI of the vehicle width direction is 80 mm, and the length in the vehicle longitudinal direction FR of the corners of the impact absorbing part 51 at the vehicle outer side of the vehicle width direction WO is a length from the flange plates 52a and 52b until it almost reaches a side wall surface 82a (the mounting surface of the fixing plate 50) of the reinforcement 8. In addition, the widths of the joining margins 511 and 512 are defined to be about 15 mm. As a result, the flange-shaped joining parts 510 protrude from the corners of the impact absorbing part 51 about 15 mm.

Flange plate 52a of two flange plates 52a and 52b extends substantially perpendicularly by being bent in the vehicle upper direction U from the long side opposite of the fixing plate 50 on the first side wall plate 511a. The other flange plate 52b extends substantially perpendicularly by being bent in the vehicle lower direction D from the long side opposite of the fixing plate 50 on the first side wall plate 511b. The flange plates 52a and 52b are formed in an approximate rectangle shape with a long side length of 170 mm and a short side length of 20 mm. Further, the impact absorbing member 5 according to the present example has mounting holes (not illustrated) that are respectively formed at the opposite end parts in a longitudinal direction of the flange plates 52a and 52b. The flange plates 52a and 52b are fixable to the vehicle body frame (not illustrated) by inserting bolts (not illustrated) as fastening members through these mounting holes and using nuts (not illustrated).

Bridge plate 53a of two bridge plates 53a and 53b extends substantially perpendicularly by being bent at the vehicle inner side WI of the vehicle width direction from the long side opposite the fixing plate 50 on the second side wall plate 512a. The other bridge plate 53b extends substantially perpendicularly by being bent at the vehicle outer side WO of the vehicle width direction from the long side opposite of the fixing plate 50 on the second side wall plate 512b. The bridge plates 53a and 53b are formed in an approximate rectangle shape; their longitudinal length is set at a length (110 mm) so that their opposite end parts overlap with the end parts of the flange plates 52a and 52b. Further, the opposite end parts of the bridge plates 53a and 53b are arranged such that they come into contact with the surface on the vehicle body frame side on the flange plates 52a and 52b (the opposite side of the impact absorbing part 51 side). In addition, a step part 54 is provided by bending at the end parts of the flange plates 52a and 52b taking into consideration the plate thickness of the bridge plates 53a and 53b. Thereby, the surfaces on the vehicle body frame sides of the flange plates 52a and 52b and the surfaces on the vehicle body frame sides of the bridge plate 53a and 53b are located on the same surface. In this state, the end parts of two flange plates 52a and 52b are respectively joined to the end parts of two bridge plates 53a and 53b by spot welding.

Figure 20:
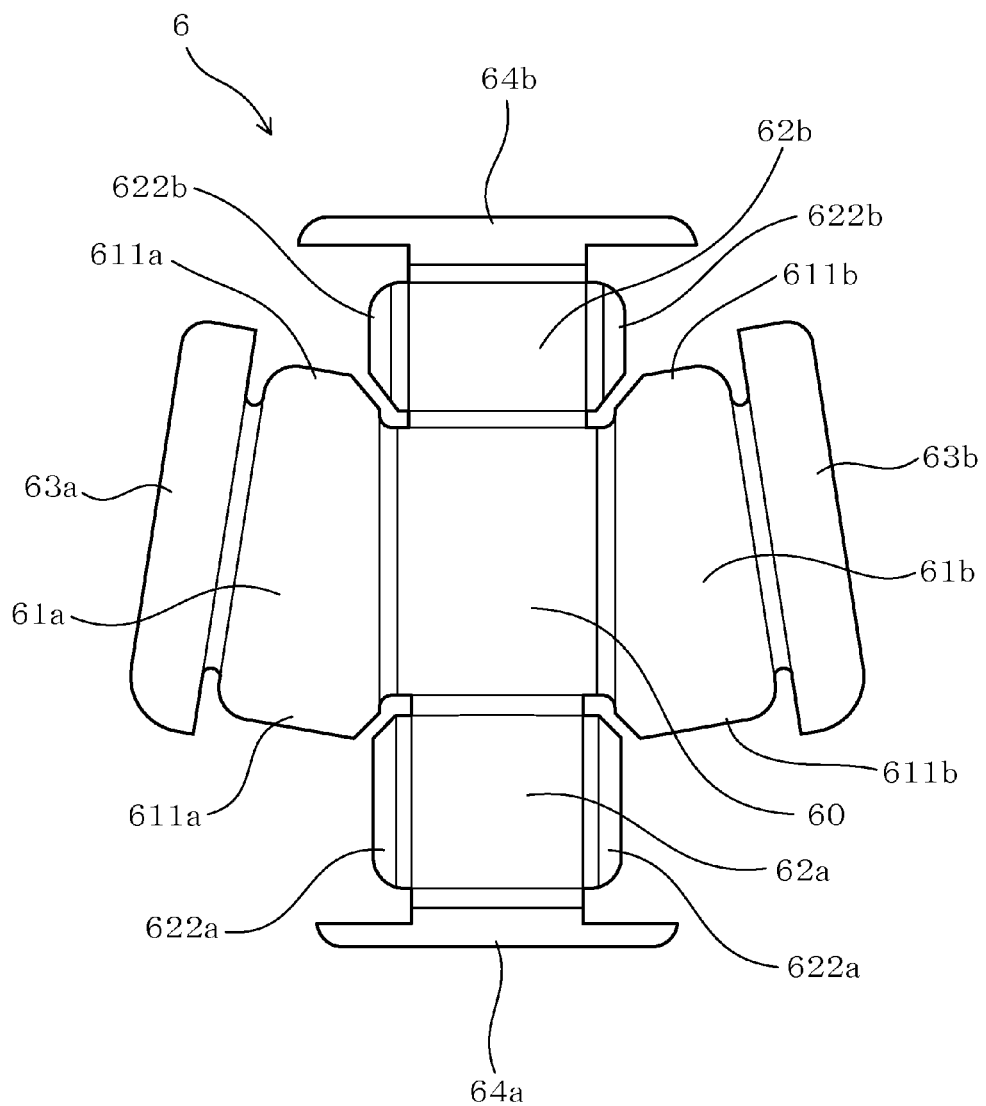
FIG. 20 is an explanatory drawing illustrating a blank for forming the impact absorbing member according to Example 6.

In FIG. 20 a blank for configuring the impact absorbing member of Example 6 is illustrated. The impact absorbing member 5 of the above-described Example 6 is configured by bending of the blank 6 illustrated in FIG. 20. The blank 6 is made from one sheet of an aluminum plate material (A6061-T6, proof stress 280 MPa, plate thickness 2.5 mm) and has portions corresponding to respective parts of the impact absorbing member 5. In FIG. 20, portion 60 corresponds to the fixing plate 50. Portion 61a corresponds to the first side wall plate 511a and portions 611a at the opposite edge parts thereof correspond to the joining margins 511 of the first side wall plate 511a. Portion 61b corresponds to the first side wall plate 511b and portions 611b at the opposite edge parts thereof correspond to the joining margins 511 of the first side wall plate 511b. Portion 62a corresponds to the second side wall plate 512a and portions 622a at the opposite edge parts thereof correspond to the joining margins 512 of the second side wall plate 512a. Portion 62b corresponds to the second side wall plate 512b and portions 622b at the opposite edge parts thereof correspond to the joining margin 512s of the second side wall plate 512b. Portion 63a corresponds to the flange plate 52a. Portion 63b corresponds to the flange plate 52b. Portion 64a corresponds to the bridge plate 53a. Portion 64b corresponds to the bridge plate 53b. These respective portions are integrally connected, and the parts illustrated with fine lines are defined as bent positions.

Figure 21:
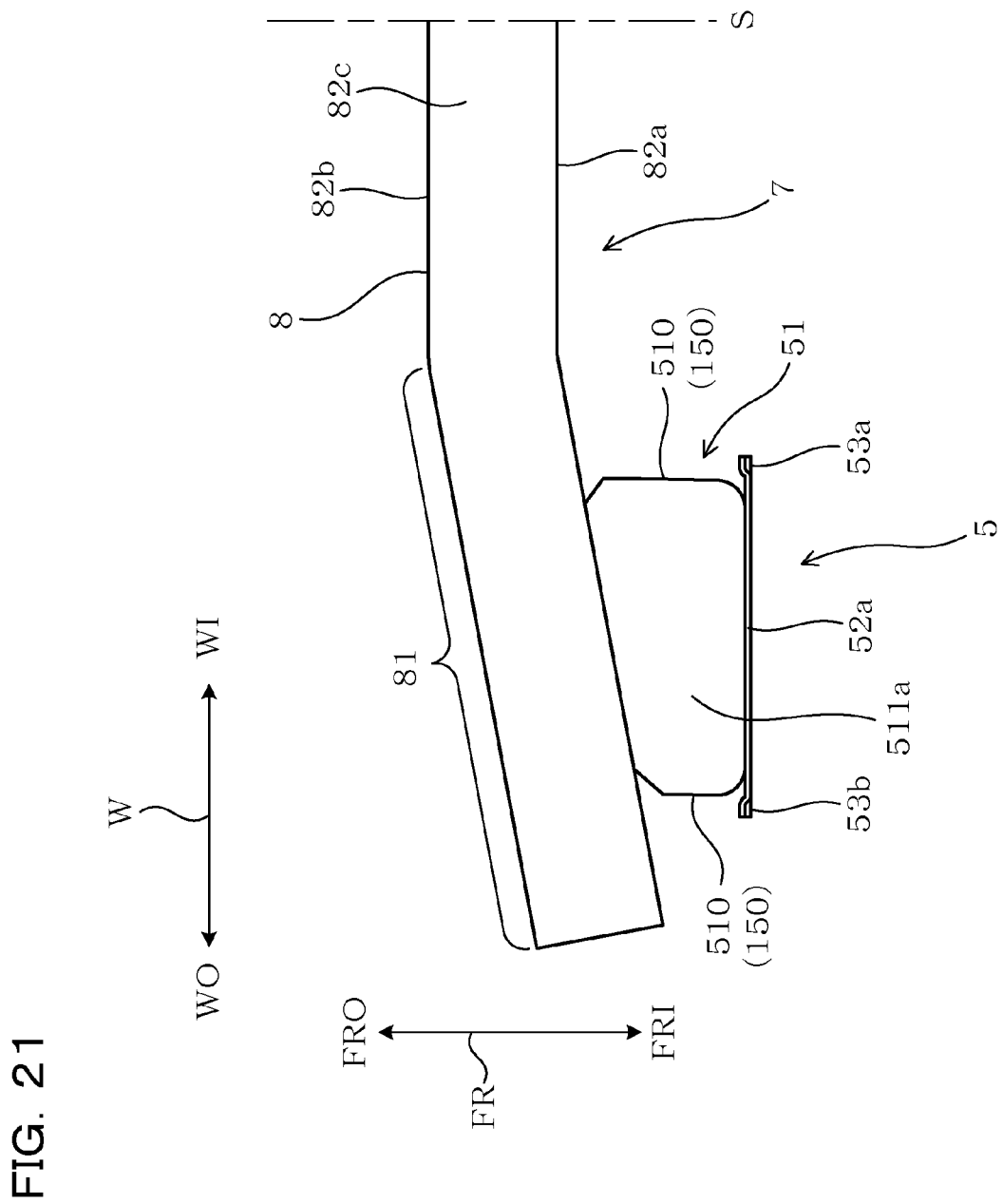
FIG. 21 is an explanatory drawing illustrating the configuration of the bumper device (in fact, in a front direction of the vehicle, namely, of the left half side when the bumper device is applied to the front bumper side) according to Example 6.
Figure 22:
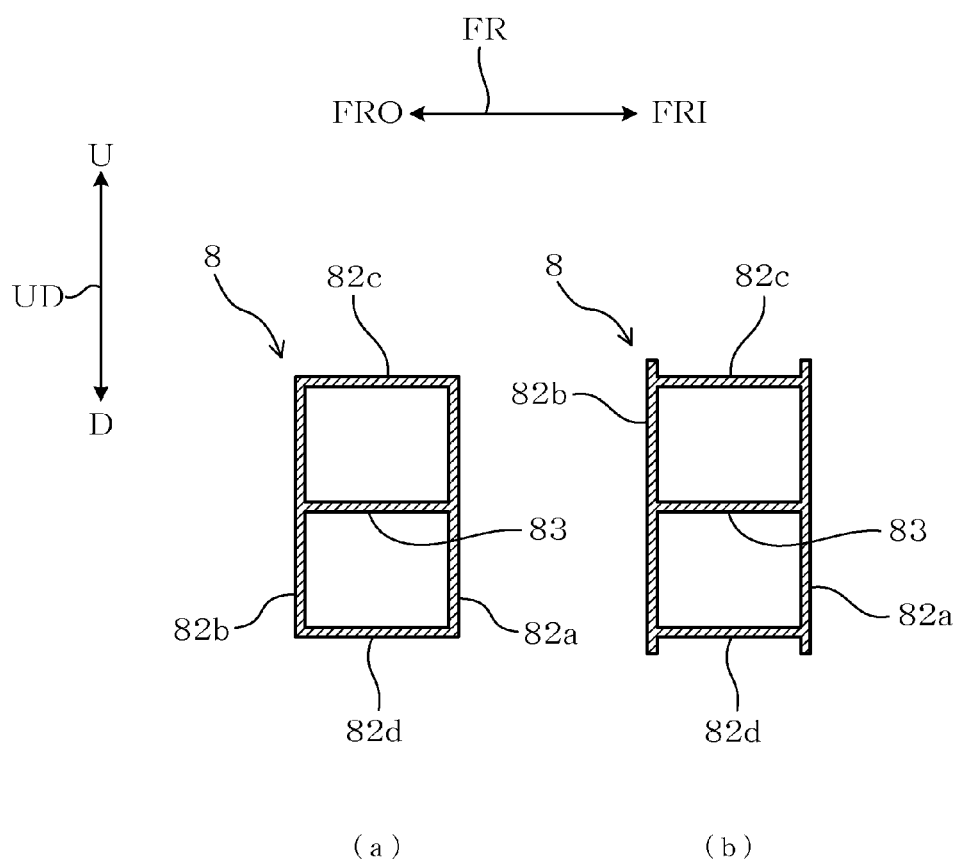
FIG. 22 is an explanatory drawing illustrating the cross-section shape of a reinforcement of the bumper device according to Example 6.

Next, the bumper device of Example 6 will be described with reference to FIGS. 21 and 22. The bumper device 7 of Example 6, as illustrated in FIG. 21, includes the reinforcement 8 for reinforcing the bumper of the vehicle and the impact absorbing member 5 of the above-described Example 6. The fixing plate 50 of the impact absorbing member 5 is fixed to the reinforcement 8. Further, FIG. 21 illustrates the left half of the bumper device 7 when the bumper device is applied to the front bumper side. On the right side of the center line S, a right half (not illustrated) in the front direction of the vehicle of the bumper device 7 exists that is symmetrical to the left half in the front direction of the vehicle of the bumper device 7. Accordingly, the bumper device 7 of the present example has two impact absorbing members 5 of the above-described Example 6.

More specifically, in the bumper device 7 according to Example 6 as illustrated in FIG. 22(a), the reinforcement 8 is formed by an aluminum hollow-shape material that has a cross-sectional shape, when sliced in the vehicle longitudinal direction FR, in the shape of an approximate "日". As illustrated in FIG. 22(b), the side wall surface 82b of the vehicle outer side FRO of the vehicle longitudinal direction and the side wall surface 82a of the vehicle inner side FRI in the vehicle longitudinal direction may protrude from the side wall surfaces 82c and 82d of the upper side U and lower side D, respectively, in the vehicle vertical direction. Further, an extruded-shape material made from A7N01-T6 (proof stress 280 MPa) has been used as the aluminum hollow-shape material.

The reinforcement 8 includes the bent part 81 that extends in the vehicle width direction W; the opposite end part sides thereof are bent towards the vehicle inner side FRI of the vehicle longitudinal direction so as to form an angle of 10° with the vehicle width direction W. The fixing plate 50 of the impact absorbing member 5 is fixed to the side wall surface 82a of the vehicle inner side FRI of the vehicle longitudinal direction on the bent part 81 of the reinforcement 8. The length and thickness of the side wall surfaces 82a and 82b, which are arranged in the vehicle longitudinal direction FR on the reinforcement 8, are set to 100 mm and 4 mm, respectively; the length and thickness of the side wall surfaces 82c and 82d, which are arranged in the vehicle vertical direction UD, are set to 80 mm and 2 mm, respectively; the thickness of a center rib 83 is set to 2 mm.

Here, the fixing plate 50 of the impact absorbing member 5 is fixed to the reinforcement 8 by linear friction stir welding. In the present example, the fixing plate 50 of the impact absorbing member 5 is specifically fixed to the reinforcement 8 by the following procedure. That is, the pin of the friction stir welding apparatus is inserted from the opening on the side of the flange plates 52a and 52b of the impact absorbing part 51 into the impact absorbing part 51. In this case, the pin is perpendicularly inserted at the location of the vehicle outer side WO of the vehicle width direction on the interior side of the fixing plate 50. Subsequently, linear friction stir welding is carried out, while rotating this pin in the state of being inserted into the fixing plate 50, by moving it nearly to the vehicle inner side WI of the vehicle width direction. After that, the welding is concluded by stopping the movement of the pin, and the pin is withdrawn from the interior of the impact absorbing part 51. In the present example, the conditions of the linear friction stir welding are set such that: the dimension of the pin: shoulder diameter 16 mm, probe diameter: tip end part 6 mm, base part 8 mm, the rotation number of the pin is 750 rpm, and the traversing speed of the pin 250 mm/min. In addition, the linear weld part has a length of 80 mm and a width of 4 mm; the number of the linear welded parts is set to 3 in the vertical direction of the vehicle.

With respect to the impact absorbing member 5 according to Example 6 configured as described above, the part count is one; as compared to the part count of the impact absorbing member 5 having three parts that used the extruded-shape material of the prior art, it is possible to reduce the part count. In addition, the impact absorbing member 5 of Example 6 excels in mass productivity since it can be easily configured from one sheet of a metal plate material by bending and spot welding. Accordingly, it can also be said that the bumper device 7 of Example 6 that uses the impact absorbing member 5 of Example 6 makes it possible to reduce the part count and it also excels in mass productivity.

Example 7

Figure 23:
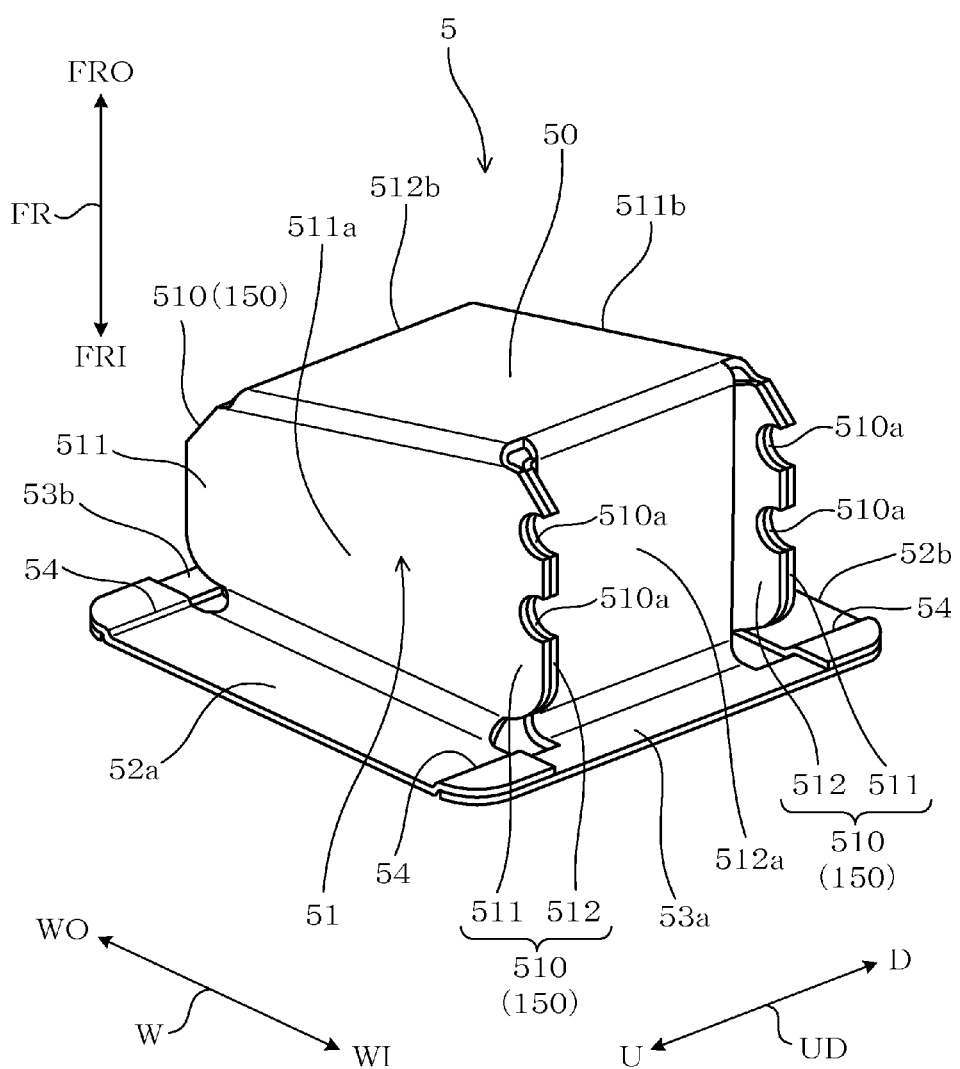
FIG. 23 is a perspective view illustrating the configuration of the impact absorbing member according to Example 7.

The impact absorbing member 5 and the bumper device 7 according to Example 7 will be described with reference to FIG. 23. The impact absorbing member 5 of Example 7 is different from the impact absorbing member 5 of Example 6 by including the below-described notched parts 510a; however, other configurations thereof are similar to those of the impact absorbing member 5 of Example 6. In addition, the bumper device 7 of Example 7 (not illustrated) has the same configuration as the bumper device 7 of Example 6 except for using the impact absorbing member 5 of Example 7 in place of the impact absorbing member 5 of Example 6.

Two notched parts 510a of the impact absorbing member 5 of Example 7 are respectively formed on the two flange-shaped joining parts 510 disposed on the vehicle inner side WI of the vehicle width direction. Further, the size and the shape of the notched parts 510a are defined as an approximate semicircle with a length in the vehicle longitudinal direction FR of 14 mm and a length in the vehicle width direction W of 7 mm. In addition, the positions of the two notched parts 510a in the flange-shaped joining parts 510 are defined to be spaced 25 mm and 50 mm, respectively, from the side of the fixing plate.

The impact absorbing member 5 and the bumper device 7 of Example 7 can also achieve the same functional effects as the impact absorbing member 5 and the bumper device 7 according to Example 6. Further, with respect the impact absorbing member 5 according to Example 7, the notched parts become origins of deformation at the time of buckling deformation. Therefore, it is possible to easily prevent the maximum load, which will be applied to the bumper device 7 including the impact absorbing member 5, from becoming too high, making it possible to assist in reducing damage to the vehicle. Further, the impact absorbing part easily undergoes buckling-deformation in a stable manner (it excels in robustness).

<Collision Performance Evaluation>

Hereinafter, a collision performance evaluation for the bumper device 7 according to Examples 6 and 7 was carried out by running a simulation using commercially-available FEM analysis software.

First, an analysis model was prepared by converting the bumper devices 7 of Examples 6 and 7 into mesh models. Next, the following properties were input in the analysis model. That is, assuming that the reinforcement 8 is made of a hollow-shape material made from an aluminum alloy having a proof stress of 280 MPa (A7N01-T6) and the impact absorbing member 5 is made from an aluminum alloy having a proof stress of 280 MPa (A6061-T6), stress-strain characteristics taking into consideration the respective proof stresses were input into the analysis model. In addition, the above-described shapes and sizes of the respective parts were applied.

Subsequently, as illustrated in the above-described FIG. 14, a simulation, which collided the load jig 95 converted into the mesh model, was performed with the above-described characteristics input into the analysis model. Further, the bumper device 9 in FIG. 14 will be used for explaining the evaluation method. A condition referred to as an offset deformable barrier (ODB) was input into the analysis model as an analysis condition. Specifically, a simulation that outputs a reaction force on the load jig 95 by the collision against the bumper device 9 with respect to the amount of deformation of the load jig 95 was performed by completely restraining the end part of the vehicle body frame side of the impact absorbing member 91 on the bumper device 9 and colliding the load jig 95 against an area of 40% of the entire length D of the reinforcement 92 at a speed setting of 1000 mm/s.

As a comparison, by using as the impact absorbing part an extruded-shape material (A6061-T6, proof stress 280 MPa) having the same outer shape dimensions as the impact absorbing part 51 of the impact absorbing member 5 of Example 6 (other than the flange-shaped joining parts 510), a bumper device was manufactured by linearly welding the entire circumference of the end part on the one side of this extruded-shape material to a fixing plate (A6061-T6, thickness 2.5 mm) and by welding the entire circumference of the end part on the other side of this extruded-shape material to a flange plate (A6061-T6, thickness 2.5 mm). The same simulation as the above-described one was performed with this bumper device identified as Comparative Example 2.

Figure 24:
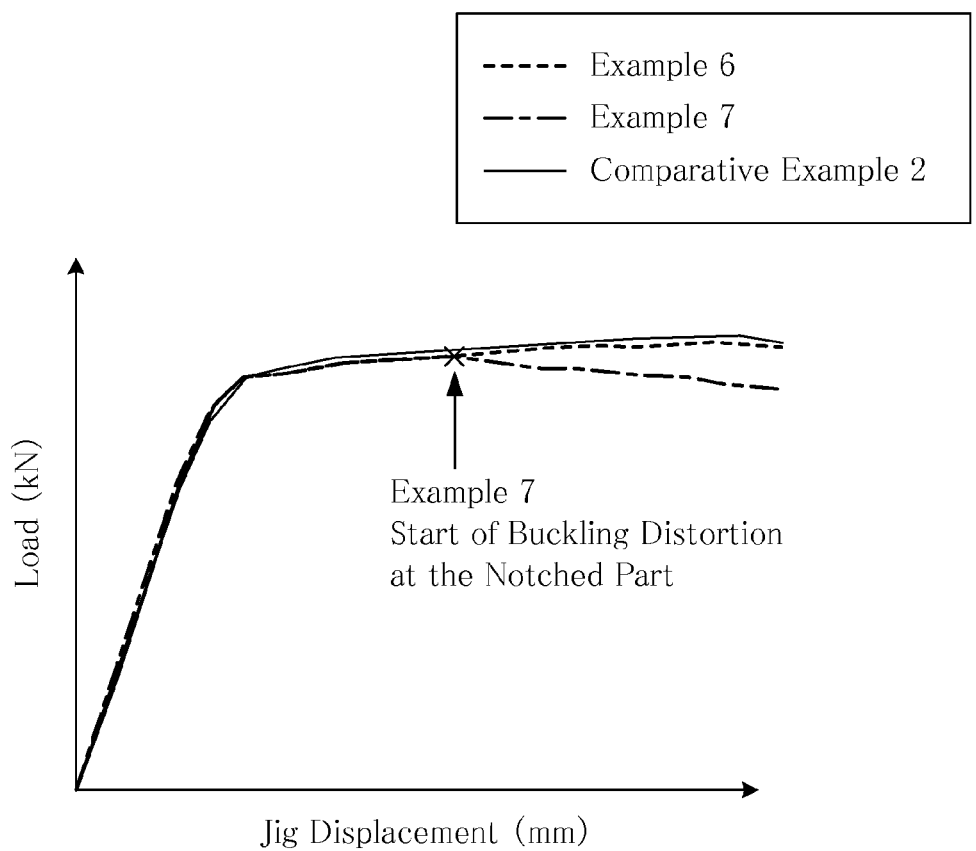
FIG. 24 illustrates simulation results showing the relationship between jig displacement and load according to Examples 6 and 7.
Figure 25:
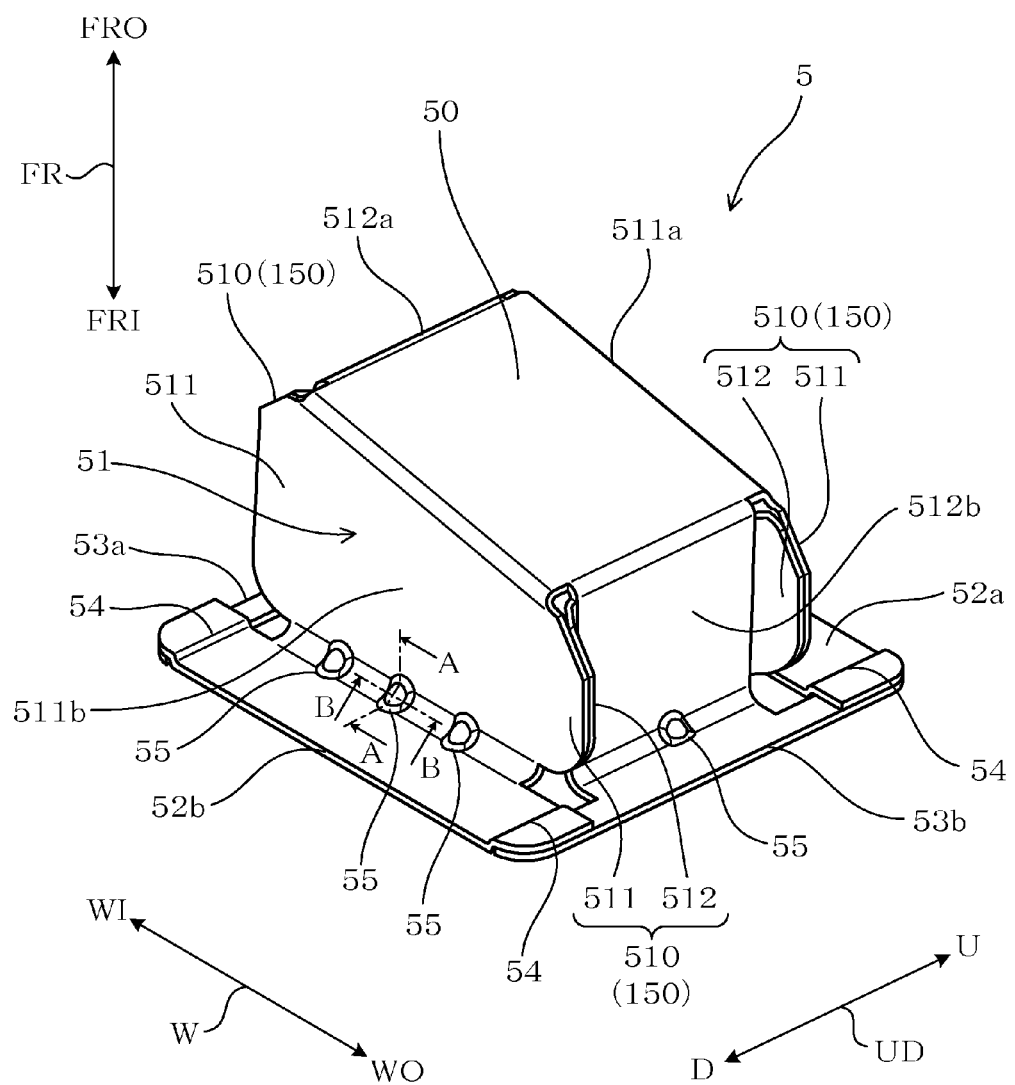
FIG. 25 is a perspective view illustrating the configuration of the impact absorbing member according to Example 8.
Figure 26:
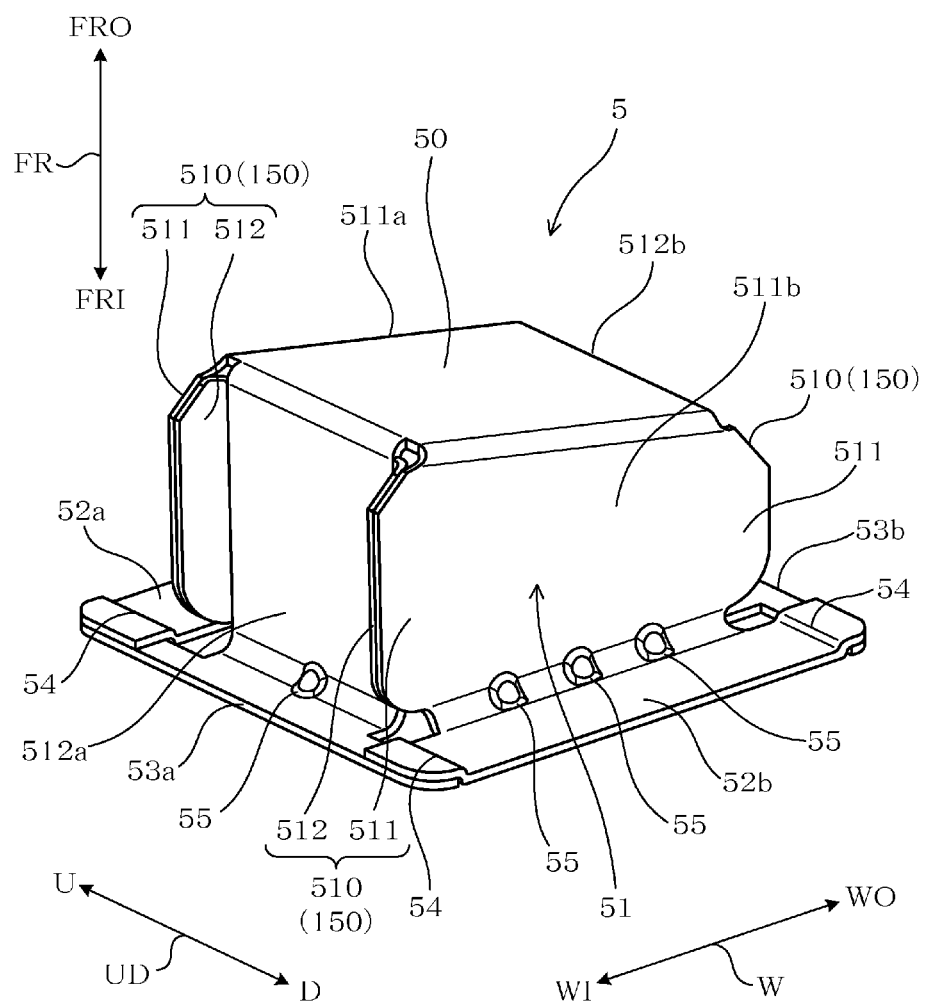
FIG. 26 is a perspective view illustrating the configuration of the impact absorbing member according to Example 8 as seen from a different angle from FIG. 25.

The simulation results are illustrated in FIG. 24. In FIG. 24, the impact energy absorption amount can be calculated by the amount of displacement of the load jig 95×the area of the load. As illustrated in FIG. 24, with respect to the bumper device 7 of Example 6, the impact is reliably transmitted to the impact absorbing member 5, and the impact absorbing member 5 appropriately undergoes buckling-deformation in the longitudinal direction of the vehicle. Thus, it has been confirmed that the impact absorbing member, which is entirely configured by bending from one sheet of a metal plate material, also can exhibit the same impact absorption properties as the bumper device of Comparative Example 2.

In addition, from the results concerning the bumper device 7 of Example 7, in case the notched parts 510a are provided on the flange-shaped joining parts 510, it was found that buckling deformation starts at the notched parts 510a. Accordingly, in case such a configuration is utilized, it is possible to easily prevent the maximum load, which will be applied to the bumper device 7, from being too high, making it possible to assist in reducing damage to the vehicle. Further, it can be said that the impact absorbing part easily undergoes buckling-deformation in a stable manner (it excels in robustness).

Moreover, with respect to the bumper devices 7 of Examples 6 and 7 configured as described above, the part count of the impact absorbing member 5 is one; as compared to a part count of 3 for the impact absorbing member with respect to the bumper device of Comparative Example 2, it is possible to reduce the part count. In addition, as compared to the bumper device of Comparative Example 2, which must integrate three components by linear welding when configuring the impact absorbing member, with respect to the bumper device 7 of Examples 6 and 7, the impact absorbing member 5 can be simply configured from one sheet of a metal plate material by bending and spot welding, and it also excels in mass productivity.

The impact absorbing member and the bumper device according to Examples 6 and 7 can ensure favorable impact absorption properties, are capable of reducing the part count, and also ensure favorable mass productivity.

Example 8

The impact absorbing member 5 and the bumper device 7 according to Example 8 will be described with reference to FIGS. 25 to 28. The impact absorbing member 5 of Example 8 is different from the impact absorbing member 5 of Example 6 by including a plurality of bead parts 55; however, other configurations thereof are similar to those of the impact absorbing member 5 of Example 6. In addition, the bumper device 7 of Example 8 has the same configuration as the bumper device 7 of Example 6 except for using the impact absorbing member 5 of Example 8 in place of the impact absorbing member 5 of Example 6.

According to the impact absorbing member 5 of Example 8, three bead parts 55 are formed at the intersecting part of the first side wall plates 511a and 511b and the flange plates 52a and 52b connected to the first side wall plates 511a and 511b; and one bead part 55 is formed at the intersecting part of the second side wall plates 512a and 512b and the bridge plates 53a and 53b connected to the second side wall plates 512a and 512b. Further, the pitch between each bead part 55 at the intersecting part of the first side wall plates 511a and 511b and the flange plates 52a and 52b is set to 25 mm. In addition, the bead parts 55 at the intersecting parts of the second side wall plates 512a and 512b and the bridge plates 53a and 53b, respectively, are formed nearly at the center of the intersecting parts.

Figure 27:
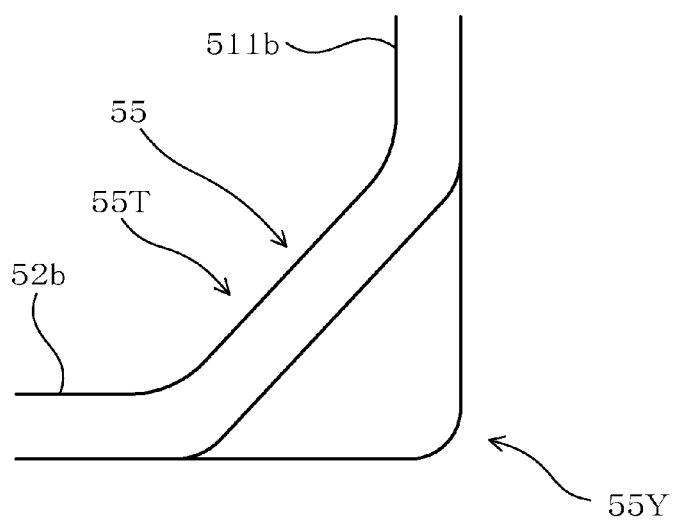
FIG. 27 is a sectional view illustrating the configuration of the A-A section in FIG. 25.
Figure 28:
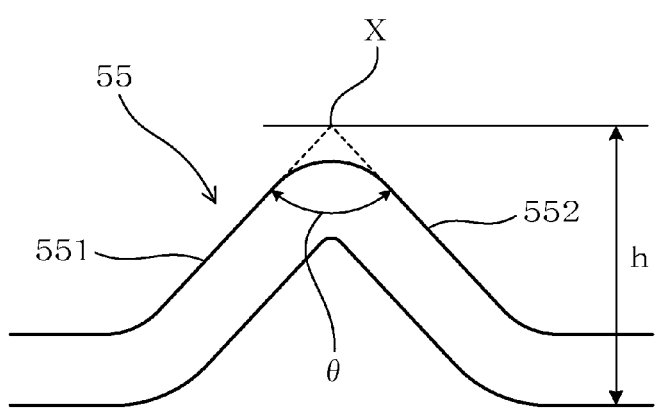
FIG. 28 is a sectional view illustrating the configuration of the B-B section in FIG. 25.

As illustrated in FIG. 27, the bead part 55 is configured by a bulging part that is caused to bulge out by plastic-deformation of the intersecting part from a mountain fold side 55Y of the intersecting part formed by bending towards a valley fold side 55T thereof. Further, in the present example, the bead part 55 has been formed by die forming. In addition, as illustrated in FIG. 28, when cut by a plane having an angle made with the flange plates 52a and 52b of 45°, the plane including the intersecting part of the first side wall plates 511a and 511b and the flange plates 52a and 52b, the cut surface of the bead part is formed as an approximate triangle shape. The angle made by a surface 551 and a surface 552 to form the bead part 55 (apex angle θ) is set to 90 degrees. In addition, the distance h from the intersecting part to the apex X of the approximate triangle shape is set to about 7 mm. Further, the bead parts 55 formed at the intersecting part of the second side wall plates 512a and 512b and the bridge plates 53a and 53b are defined to be similarly configured.

The impact absorbing member 5 and the bumper device 7 according to Example 8 can also achieve the same functional effects as those of the impact absorbing member 5 and the bumper device 7 according to Example 6. Further, by including the bead parts 55, the impact absorbing member 5 according to Example 8 excels in resistance to deformation at the intersecting parts of the first side wall plates 511a and 511b and the flange plates 52a and 52b and the intersecting parts of the second wall plates 512*a* and 512*b* and the bridge plates 53*a* and 53*b*. Therefore, a bumper device 7 of Example 8 that includes this impact absorbing member 5 is capable of exhibiting favorable towing properties.

<Towing Properties Evaluation>

Hereinafter, a towing properties evaluation for the bumper device 7 of Example 8 was carried out by running a simulation using commercially-available FEM analysis software.

First, an analysis model was made by converting the bumper device 7 of Example 8 into a mesh model. Next, the following properties were input into the analysis model. That is, assuming that the reinforcement 8 is made from a hollow-shape material of an aluminum alloy having a proof stress of 280 MPa (A7N01-T6) and the impact absorbing member 5 is made from an aluminum alloy having a proof stress of 280 MPa (A6061-T6), stress-strain characteristics taking into account the respective proof stresses were input into the analysis model. In addition, the above-described shapes and sizes of the respective parts were applied. Here, the bumper device of Comparative Example 2 was used for comparison.

Next, a simulation for investigating the towing properties was run with the above-described characteristics input into the analysis model. Further, the bumper device 9 in FIG. 16 will be used for explaining the evaluation method. Specifically, a towing hook 94 was assumed to be attached to a side wall surface 92*b* of the vehicle outer side FRO of the vehicle longitudinal direction on a bent part 920 of a reinforcement 92, and this position was subjected to a forced displacement (displacement in the direction of the outer side FRO of the vehicle longitudinal direction, in the direction of arrow P in FIG. 16) at a speed setting of 100 mm/s. In FIG. 16, reference number 93 denotes a rigid body that simulates the vehicle body frame. A flange plate 910 is fastened to this rigid body 93 by bolts and nuts (not illustrated). Further, in evaluation of the present example, respective bead parts 55 are present between mounting holes of the two bolts installed in the flange plates 52*a* and 52*b*.

Figure 29:
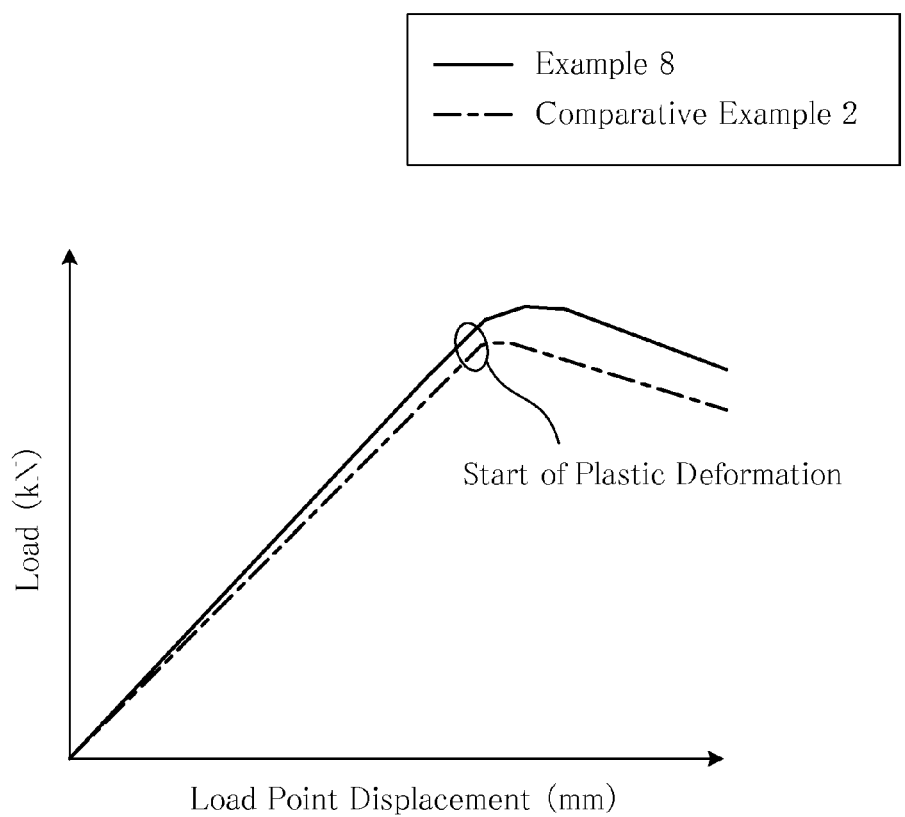
FIG. 29 illustrates simulation results showing the relationship between load point displacement and load according to Example 8.

The simulation results of the towing properties in the case in which the bead parts 55 are formed are illustrated in FIG. 29. FIG. 29 illustrates the relationship between load point displacement and load, and the amount of displacement amount at the start of the plastic-deformation can be obtained from this Figure. As illustrated in FIG. 29, the bumper device 7 of Example 8 is understood as having a lesser amount of displacement than the bumper device of Comparison Example 2 when the same load is applied. In addition, the load that initiates the plastic-deformation is understood to be higher for the bumper device 7 of Example 8 than the bumper device of Comparative Example 2. From these results, it has been confirmed that the impact absorbing member 5 of Example 8 excels in resistance to deformation at the intersecting part of the first side wall plates 511*a* and 511*b* and the flange plates 52*a* and 52*b* and at the intersecting part of the second side wall plates 512*a* and 512*b* and the bridge plates 53*a* and 53*b*, and the bumper device 7 of Example 8 this impact absorbing member 5 can exhibit favorable towing properties.

As described above, the impact absorbing member and the bumper device according to Example 8 exhibit favorable impact absorption properties, can reduce the part count, and also ensure favorable mass productivity. Further, it is possible to ensure favorable towing properties without losing mass productivity by forming the bead parts having relatively simple configurations.

Example 9

Figure 30:
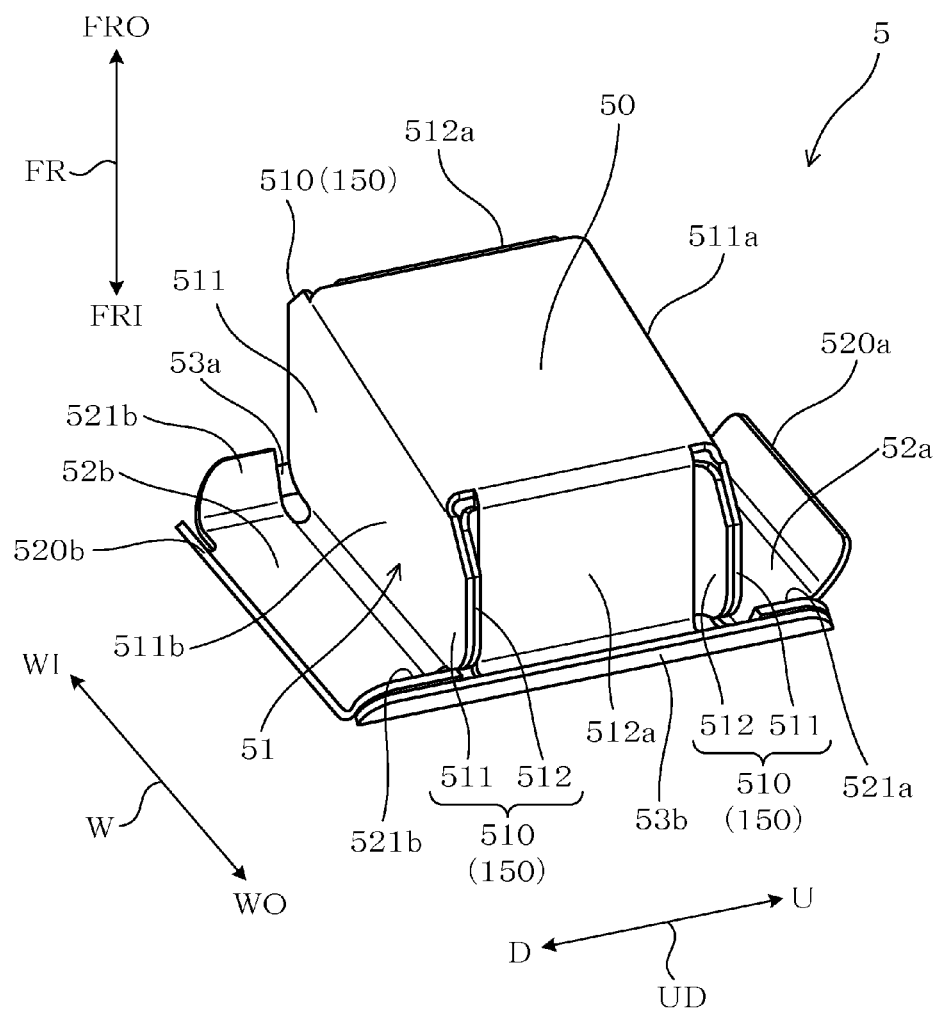
FIG. 30 is a perspective view illustrating the configuration of the impact absorbing member according to Example 9.
Figure 31:
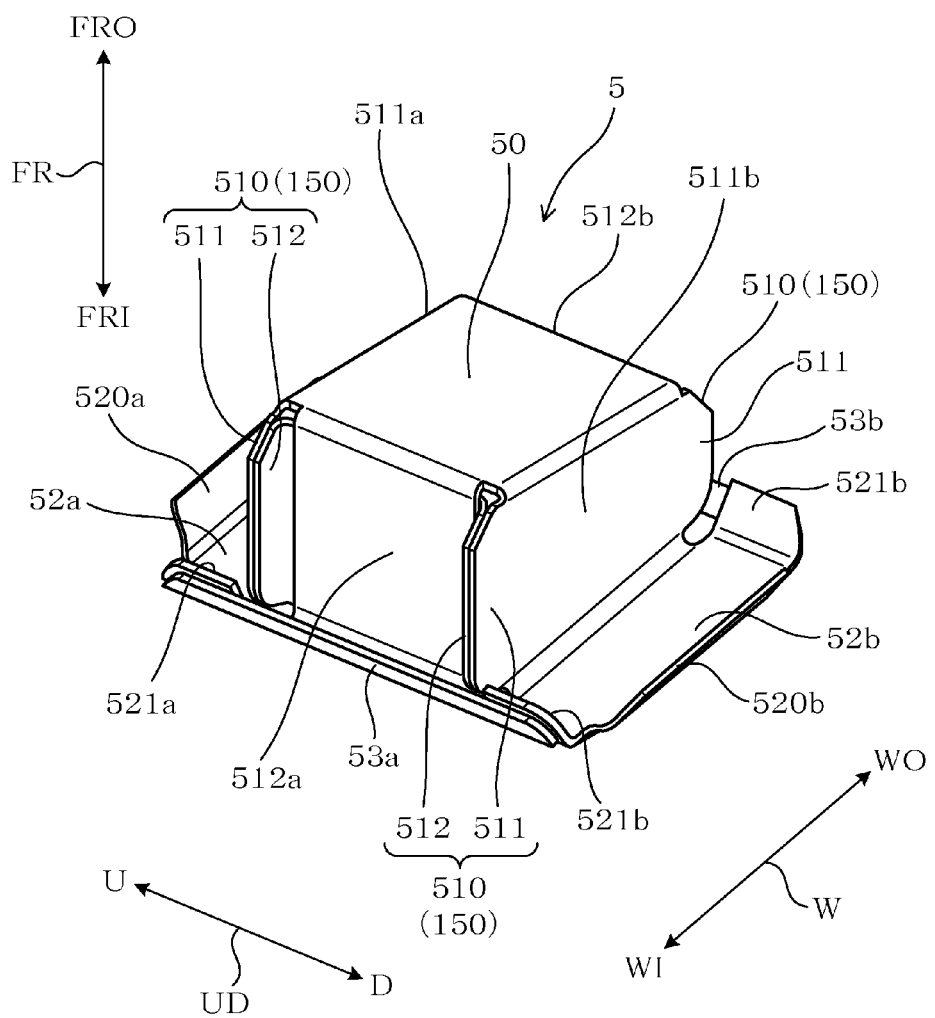
FIG. 31 is a perspective view illustrating the configuration of the impact absorbing member according to Example 9 as seen from a different angle from FIG. 30.

Next, the impact absorbing member 5 and the bumper device 7 according to Example 9 will be described with reference to FIG. 30 and FIG. 31. The impact absorbing member 5 of Example 9 is different from the impact absorbing member 5 of Example 6 by including the below-described bent pieces 520*a* and 520*b* and bent pieces 521*a* and 521*b*; however, other configurations thereof are similar to those of the impact absorbing member 5 of Example 6. In addition, the bumper device 7 of Example 9 has the same configuration as the bumper device 7 of Example 6 except for using the impact absorbing member 5 of Example 9 in place of the impact absorbing member 5 of Example 6. Accordingly, the impact absorbing member 5 and the bumper device 7 of Example 9 are capable of achieving the same functional effects as the impact absorbing member 5 and the bumper device 7 according to Example 6.

According to the impact absorbing member 5 of Example 9, the bent pieces 520*a* and 520*b* are formed by outwardly extending projecting pieces that project from the sides of the flange plates 52*a* and 52*b* opposite the first side wall plates 511*a* and 511*b* and by bending these projecting pieces towards the impact absorbing part 51 side. The lengths in the longitudinal direction of the bent pieces 520*a* and 520*b* are shorter than the distance between the joining parts with the bridge plates 53*a* and 53*b* that are formed at the opposite end parts of the flange plates 52*a* and 52*b*, preventing the bent pieces 520*a* and 520*b* from interfering with the bent portions of the joining parts.

In addition, the bent pieces 521*a* and 521*b* are formed by bending the flange plates 52*a* and 52*b* and the bridge plates 53*a* and 53*b* themselves towards the impact absorbing part 51 side at a position that is slightly inward of the attachment point of the bridge plates 53*a* and 53*b* with the opposite end parts in the longitudinal direction of the flange plates 52*a* and 52*b*.

The angles made by the flange plates 52*a* and 52*b* at the impact absorbing part 51 side and the bent pieces 520*a* and 520*b* are each set to 120°. In addition, the angles made by the non-bent plate surfaces of the flange plates 52*a* and 52*b* at the impact absorbing part 51 side and the bent pieces 521*a* and 521*b* are also each set to 120°. Hereinafter, in order to confirm the effects caused by the bending for the impact absorbing member 5 and the bumper device 7 according to Example 9, an evaluation of the towing properties was carried out by running a similar simulation to the simulation explained in Example 8.

Figure 32:
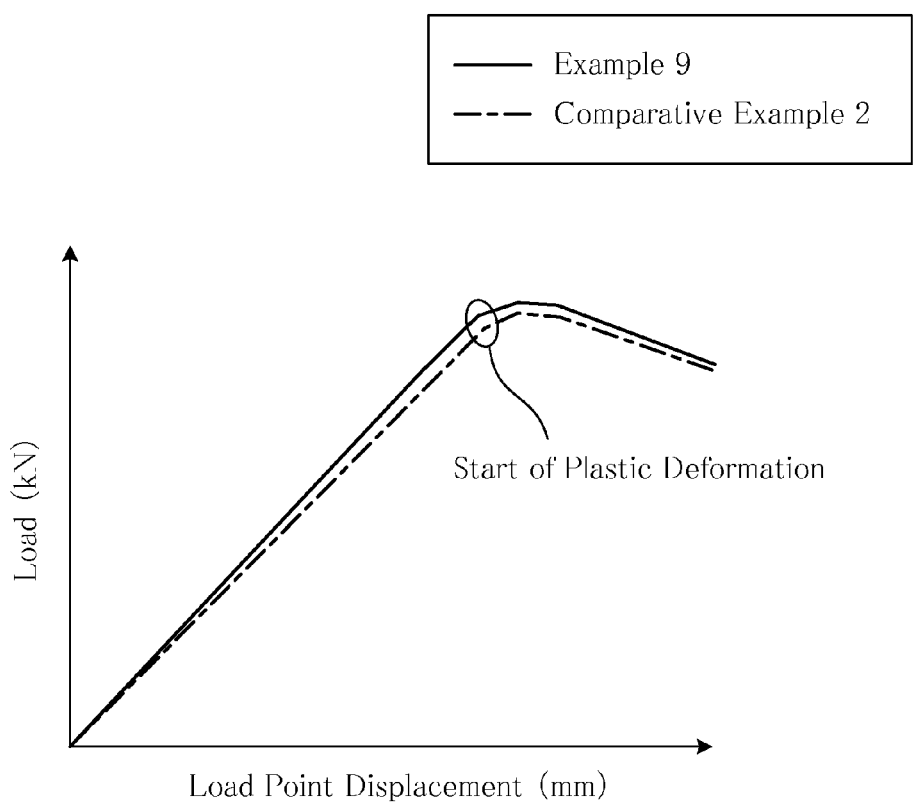
FIG. 32 illustrates simulation results showing the relationship between load point displacement and load according to Example 9.

The simulation results of the towing properties, in the case in which the bent pieces are formed, are illustrated in FIG. 32. As illustrated in FIG. 32, the bumper device 7 of Example 9 is understood as having a lesser amount of displacement than the bumper device of Comparative Example 2 when the same load is applied. In addition, the load at the initiation of the plastic-deformation in the bumper device 7 of Example 9 is understood as being higher than the bumper device of Comparative Example 2. From these results, it has been confirmed that the impact absorbing member 5 of Example 9 can improve the resistance to deformation in the flange plates 52*a* and 52*b* and the bridge plates 53*a* and 53*b* due to an improvement in the rigidity of the flange plates 52*a* and 52*b* and the bridge plates 53*a* and 53*b*; the bumper device 7 of Example 9 that uses this impact absorbing member 5 can exhibit favorable towing properties.

As described above, the impact absorbing member and the bumper device according to Example 9 can ensure favorable impact absorption properties, are capable of reducing the part count, and also can ensure favorable mass productivity. Further, by utilizing a relatively simple configuration such as the formation of the bent pieces, favorable towing properties can be exhibited without losing mass productivity.

Although an explanation was provided above concerning respective examples, the present invention is not limited to the above-described examples and various modifications can be made without departing from the scope of the invention.

The invention claimed is:

1. An impact absorbing member formed entirely from one bent sheet of a metal plate material, comprising:
    a fixing plate having an approximate square or rectangular shape for fixing to a reinforcement of a vehicle bumper;
    an impact absorbing part comprising two first side wall plates each having an approximate square or rectangular shape, both first side wall plates extending towards one side substantially perpendicularly from two opposite sides of the fixing plate, and two second side wall plates each having an approximate square or rectangular shape, both second side wall plates extending towards said one side substantially perpendicularly from a remaining two opposite sides of the fixing plate;
    two flange plates for fixing to a frame of a vehicle body, the two flange plates respectively extending substantially perpendicularly outwardly from a side of each of the two first side wall plates that is opposite of the fixing plate; and
    two bridge plates that respectively bridge first and second gaps between opposing end parts of the two flange plates, the two bridge plates respectively extending substantially perpendicularly outwardly from a side of each of the two second side wall plates that is opposite of the fixing plate, wherein
    the impact absorbing part overall has an approximate square or rectangular tube shape, and further comprises joining parts that join opposite edge parts of the two first side wall plates with respective overlapping, opposing edge parts of the two second side wall plates that are adjacent to the opposite edge parts of the two first side wall plates, and
    the opposing end parts of the two flange plates are each respectively joined to adjacent end parts of the two bridge plates.

2. The impact absorbing member according to claim 1, wherein
    the joining parts each comprise a flange-shaped joining part, wherein for each flange-shaped joining part:
    joining margins are respectively provided on one of the opposing edge parts of the two first side wall plates and on adjacent one of the opposing edge parts of the two second side wall plates, and
    the adjacent joining margins of the first side wall plate and the second side wall plate overlap and are joined.

3. The impact absorbing member according to claim 2, wherein at least one notch is defined in the flange-shaped joining part.

4. The impact absorbing member according to claim 3, wherein at least one bead is defined at at least one intersecting part of one of the first side wall plates and an adjacent one of the flange plates and/or at at least one intersecting part of one of the second side wall plates and an adjacent one of the bridge plates.

5. The impact absorbing member according to claim 4, wherein each flange plate and/or each bridge plate has (have) a bent piece that bends toward an impact absorbing part side of the impact absorbing member.

6. The impact absorbing member according to claim 1, wherein the metal plate material is comprised of aluminum or an aluminum alloy.

7. A device, comprising:
    a reinforcement configured to reinforce a bumper of a vehicle; and
    the impact absorbing member according to claim 6,
    wherein the fixing plate of the impact absorbing member is fixed to the reinforcement.

8. The device according to claim 7, wherein the fixing plate of the impact absorbing member is fixed to the reinforcement by at least one friction stir weld.

9. The impact absorbing member according to claim 1, wherein each of the joining parts is comprised of a joining margin that integrally extends from one of the edge parts of the two first side wall plates, the joining margin extending along and being joined to an adjacent surface of one of the second side wall plates.

10. The impact absorbing member according to claim 9, wherein the joining margin extends at least substantially perpendicularly to a center portion of one of the first side wall plates.

11. The impact absorbing member according to claim 1, wherein each of the joining parts is comprised of a joining margin that integrally extends from one of the edge parts of the two second side wall plates, the joining margin extending along and being joined to an adjacent surface of one of the first side wall plates.

12. The impact absorbing member according to claim 11, wherein the joining margin extends at least substantially perpendicularly to a center portion of one of the second side wall plates.

13. The impact absorbing member according to claim 1, wherein at least one bead is defined at at least one intersecting part of one of the first side wall plates and an adjacent one of the flange plates and/or at at least one intersecting part of one of the second side wall plates and an adjacent one of the bridge plates.

14. The impact absorbing member according to claim 1, wherein each flange plate and/or each bridge plate has (have) a bent piece that bends toward an impact absorbing part side of the impact absorbing member.

15. A device, comprising:
    a reinforcement configured to reinforce a bumper of a vehicle; and
    the impact absorbing member according to claim 1, wherein
    the fixing plate of the impact absorbing member is fixed to the reinforcement.

16. The device according to claim 15, wherein the fixing plate of the impact absorbing member is fixed to the reinforcement by at least one friction stir weld.

17. A metallic impact absorbing device, comprising:
    a first plate configured to be affixed to a reinforcement of a vehicle bumper;
    a pair of second plates that each bend at least substantially perpendicularly from the first plate in an integral manner and without a seam therebetween, wherein the second plates extend at least substantially in parallel to each other, a first edge of each of the second plates is adjacent to the first plate, and each second plate first edge is straight,
    a pair of third plates that each bend at least substantially perpendicularly from the first plate in an integral manner and without a seam therebetween, wherein the third plates extend at least substantially in parallel to each other, wherein center portions of each of the second plates extend at least substantially perpendicular to respective center portions of the third plates, and wherein a first edge of each of the third plates is adjacent to the first plate, each third plate first edge being straight, a pair of fourth plates that each bend outwardly from a respective second edge of each of the second plates in an integral manner and without a seam therebetween, wherein the second edge of each second plate is disposed on an opposite side from the first edge of the second plate, at least one portion of each of the fourth plates extends at least substantially perpendicular to the second plates, and wherein said at least one portions of the respective fourth plates extend in a same plane and are configured to be affixed to a vehicle body frame, a pair of fifth plates that each bend outwardly from a respective second edge of each of the third plates in an integral manner and without a seam therebetween, wherein the second edge of each third plate is disposed on an opposite side from the first edge of the third plate, wherein:

each of the second plates has a third edge and a fourth edge, each of which intersects the first edge and the second edge of the second plate, each of the third plates has a third edge and a fourth edge, each of which intersects the first edge and the second edge of the third plate, joining margins are respectively defined along an end portion of: (i) each of the third edge and the fourth edge of each of the second plates and/or (ii) each of the third edge and the fourth edge of each of the third plates, either (i) both of the joining margins of the second plates or (ii) both of the joining margins of the third plates bend at least substantially perpendicularly in an integral manner and without a seam from the center portion of the respective second plate or third plate, each of the joining margins overlaps one surface portion or joining margin of an adjacent second plate or third plate and is welded thereto, and end portions of each of the fourth plates respectively overlap and are welded to end portions of each of the fifth plates.

18. The metallic impact absorbing device according to claim 17, wherein at least one bead is defined at an intersection of: (i) one of the second plates and one of the fourth plates and/or (ii) one of the third plates and one of the fifth plates.

19. A method of manufacturing the impact absorbing member according to claim 1, comprising:

providing a single metallic blank having the fixing plate integrally connected without a seam to the first and second side wall plates of the impact absorbing part, wherein the flange plates are respectively integrally connected without a seam to the first side wall plates and the bridge plates are respectively integrally connected without a seam to the second side wall plates, bending the single blank at least substantially perpendicularly along respective intersections: (i) between the fixing plate and each of the first and second side wall plates, (ii) between the respective first side wall plates and the flange plates, and (iii) between the respective second side wall plates and the bridge plates, bending either (i) opposite end portions of both of the first side wall plates or (ii) opposite end portions of both of the second side wall plates at least substantially perpendicularly from a central portion of a respective one of the first or second side wall plates, friction stir welding each set of adjacent end portions of the first and second side wall plates, and friction stir welding each set of adjacent end portions of the flange plates and the bridge plates.

20. The impact absorbing member according to claim 10, wherein a notch is defined at each corner of the fixing plate.

* * * * *